United States Patent
Kanai et al.

(10) Patent No.: US 7,014,949 B2
(45) Date of Patent: *Mar. 21, 2006

(54) BATTERY PACK AND RECHARGEABLE VACUUM CLEANER

(75) Inventors: Hideyuki Kanai, Kawasaki (JP); Motoya Kanda, Yokohama (JP); Katsumi Hisano, Matsudo (JP); Hideo Iwasaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/327,105

(22) Filed: Dec. 24, 2002

(65) Prior Publication Data
US 2003/0134189 A1 Jul. 17, 2003

(30) Foreign Application Priority Data
Dec. 28, 2001 (JP) .............................. 2001-401855

(51) Int. Cl.
*H01M 2/00* (2006.01)
(52) U.S. Cl. .................. 429/148; 429/156; 429/99; 429/120
(58) Field of Classification Search ............... 429/96, 429/100, 99, 156, 148, 146, 153, 151, 164, 429/120, 82, 83; 320/107, 112, 119, 120
See application file for complete search history.

(56) References Cited

U.S. PATENT DOCUMENTS

| | | | | |
|---|---|---|---|---|
| 6,111,387 A | * | 8/2000 | Kouzu et al. ............... | 320/107 |
| 2003/0007322 A1 | * | 1/2003 | Amemiya et al. .......... | 361/683 |
| 2003/0082439 A1 | * | 5/2003 | Sakakibara ................. | 429/120 |

FOREIGN PATENT DOCUMENTS

| JP | 10-27591 | 1/1998 |
|---|---|---|
| JP | 10-270095 | 10/1998 |
| JP | 11-111248 | 4/1999 |
| JP | 11-329515 | 11/1999 |
| JP | 2000-67825 | 3/2000 |
| JP | 2001-110379 | 4/2001 |
| JP | 2001-135290 | 5/2001 |
| JP | 2001-297741 | 10/2001 |
| JP | 2001-325996 | 11/2001 |

OTHER PUBLICATIONS

U.S. Appl. No. 10/327,105, filed Dec. 24, 2002, Kanai et al.
U.S. Appl. No. 10/388,636, filed Mar. 17, 2003, Hisano et al.

* cited by examiner

*Primary Examiner*—Raymond Alejandro
(74) *Attorney, Agent, or Firm*—Oblon, Spivak, McClelland, Maier & Neustadt, P.C.

(57) ABSTRACT

A battery pack includes an outer case, and a plurality of cylindrical lithium ion secondary batteries accommodated in the outer case in vertical N rows and lateral M rows (N rows $\leq$ M rows), with a gap between the secondary batteries, wherein the outer case has a draft port opened in a first wall facing an outer circumferential surface of the secondary batteries in the first vertical row, and an exhaust port opened in a second wall positioned at the opposite side of the first wall, in each secondary battery in the first vertical row and the second vertical row, a part of the outer circumferential surface, which is at a shorter distance from the first wall than any other parts, faces the draft port of the outer case.

19 Claims, 15 Drawing Sheets

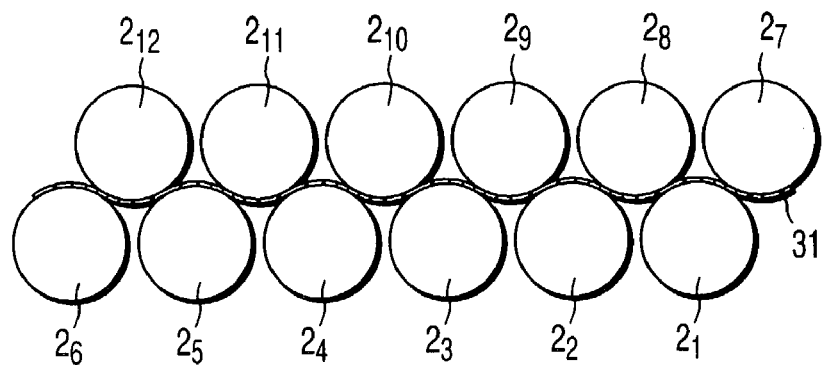
F I G. 6
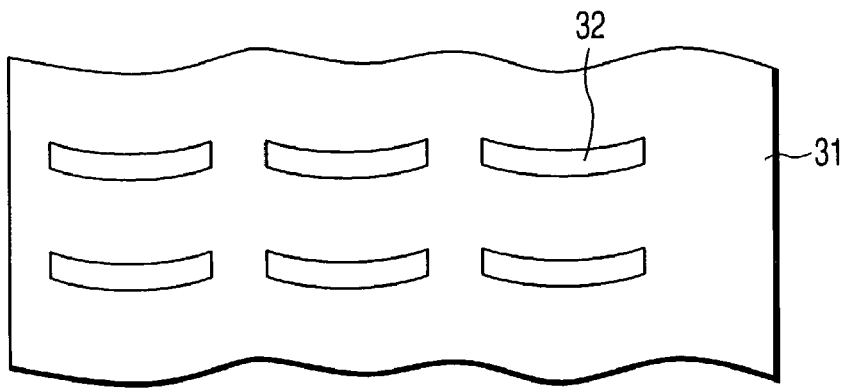
F I G. 7
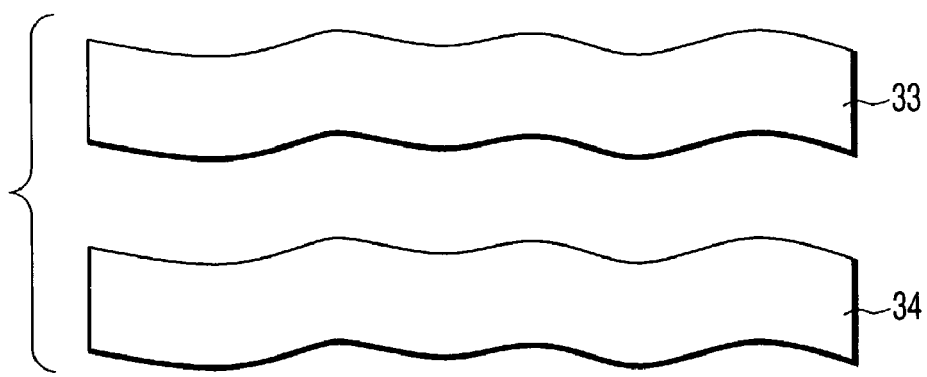
F I G. 8

BATTERY PACK AND RECHARGEABLE VACUUM CLEANER

CROSS-REFERENCE TO RELATED APPLICATIONS

This application is based upon and claims the benefit of priority from the prior Japanese Patent Application No. 2001-401855, filed Dec. 28, 2001, the entire contents of which are incorporated herein by reference.

BACKGROUND OF THE INVENTION

1. Field of the Invention

The present invention relates to a battery pack including cylindrical lithium ion secondary batteries, and a rechargeable vacuum cleaner including the battery pack.

2. Description of the Related Art

Lithium ion secondary batteries are small and lightweight, and can be charged and discharged more than 300 cycles repeatedly, and are hence used widely in laptop computers, cellular phones and many other electronic appliances, and the demand is increasing. This is because the weight energy density of the lithium ion secondary battery (LIB) is higher than in the nickel-cadmium secondary battery (Ni—Cd) and nickel mercury secondary battery (Ni-MH). The weight energy density is 44 Wh/kg in Ni—Cd, 54 Wh/kg in Ni-MH, and 150 Wh/kg in LIB, and it is outstandingly high in the LIB.

In various electronic devices such as a digital camera, consumer electric appliances such as a video camera and a cordless cleaner, an electric-assisted bicycle, and the like, so far, Ni—Cd batteries have been used, but in the recent trend toward smaller size and lighter weight, the power supply unit is being converted from the Ni—Cd to the Ni-MH, and further to the LIB. Although the demand for the LIB is increasing, it is not replacing the Ni—Cd or Ni-MH completely.

At the present, the LIB is used in products of a relatively small current consumption. When expressed in C rate (the current discharging the full charged capacity of a unit cell in one hour), it is about 1C, which is a relatively small current of about 1 A. Applicable products are a personal computer, a cellular phone, a digital camera, and a portable audio device (walkman), and it is not applied in products of large current consumption, such as a power tool for driving a motor, a cordless cleaner, an uninterrupted power source (UPS), an electric-assisted bicycle, and a hybrid type car. The reason is that dendrite of metal is likely to precipitate on the negative electrode of the LIB when charging and discharging of large current are repeated, and precipitates of lithium dendrite may reach up to the positive electrode through the separator, thereby causing internal short-circuit, which leads to a safety problem.

Not limited to cylindrical or prismatic type, charging and discharging reaction of the lithium ion secondary battery hardly occurs uniformly on the entire surface of the electrode, but tends to be concentrated in the central area. Accordingly, when charged or discharged at high rate, dendrite of Li metal is likely to grow in a short time, especially on the negative electrode. In the Ni-MH secondary battery, the internal resistance is extremely low, being about several micro-ohms, and Joule heat generation is very small, and hence safety can be assured even if discharged continuously at high rate. In the lithium ion secondary battery, on the other hand, the internal impedance is 50 to 80 mΩ, being nearly 20 cycles that of the Ni-MH. Therefore, if the lithium ion secondary battery is discharged at high rate in the same condition as in the Ni-MH secondary battery, the temperature inside of the battery is raised by the Joule heat, and dendrite growth is promoted, and the incidence rate of internal short-circuit increases. Owing to this reason, the lithium ion secondary battery is not used in high rate discharge applications, and hence is cannot be applied in products consuming a large current such as a cordless cleaner, a robot, a UPS, and an electric-assisted bicycle.

Meanwhile, Jpn. Pat. Appln. KOKAI Publication No. 10-270095 discloses, in claim 1, a cooling device for battery power source, being a device for cooling a multiplicity of battery modules in a holder case, having a multiplicity of battery modules formed by connecting a plurality of unit cells in a row and connected in series electrically and mechanically, in the holder case, and moving the air by force in the holder case in one direction, in which the flowing direction of the air is a direction orthogonal to the longitudinal direction of the battery module.

In this cooling device, as mentioned in paragraphs [0009] and [0024] in the publication, unit cells composing each battery module are cooled uniformly. Hence, when this cooling device is used for cooling the lithium ion secondary battery, long life is not expected in the charging and discharging cycles for discharging at high rate.

BRIEF SUMMARY OF THE INVENTION

The present invention relates to a battery pack enhanced in the cycle characteristic at high rate discharge, and a rechargeable vacuum cleaner comprising the battery pack.

According to first aspect of the present invention, there is provided a battery pack comprising an outer case, and a plurality of cylindrical lithium ion secondary batteries accommodated in the outer case in vertical N rows and lateral M rows (N rows$\leq$M rows), with a gap between the secondary batteries, wherein the outer case has a draft port opened in a first wall facing an outer circumferential surface of the secondary batteries in the first vertical row, and an exhaust port opened in a second wall positioned at the opposite side of the first wall, in each secondary battery in the first vertical row and the second vertical row, a part of the outer circumferential surface, which is at a shorter distance from the first wall than any other parts, faces the draft port of the outer case.

According to second aspect of the present invention, there is provided a battery pack comprising an outer case, and a battery set that includes cylindrical lithium ion secondary batteries as unit cells and is accommodated in the outer case, wherein the unit cells are accommodated in the outer case with a longitudinal direction being parallel to a gravitational direction, in vertical N rows and lateral M rows (N rows$\leq$M rows), with a gap between the unit cells, the outer case has a draft port opened in a first wall facing an outer circumferential surface of the unit cells in the first vertical row, and an exhaust port opened in a second wall positioned at the opposite side of the first wall, in the unit cells in the first vertical row and the second vertical row, a part of the outer circumferential surface, which is at a shorter distance from the first wall than any other parts, faces the draft port of the outer case.

According to third aspect of the present invention, there is provided a rechargeable vacuum cleaner comprises a battery pack, wherein the battery pack includes an outer case, and a plurality of cylindrical lithium ion secondary batteries accommodated in the outer case in vertical N rows and lateral M rows (N rows≦M rows), with a gap between the secondary batteries, the outer case has a draft port opened in a first wall facing an outer circumferential surface of the secondary batteries in the first vertical row, and an exhaust port opened in a second wall positioned at the opposite side of the first wall, in each secondary battery in the first vertical row and the second vertical row, a part of the outer circumferential surface, which is at a shorter distance from the first wall than any other parts, faces the draft port of the outer case.

According to fourth aspect of the present invention, there is provided a rechargeable vacuum cleaner comprises a motor and a battery pack provided in an intake route or an exhaust route of the motor, wherein the battery pack includes an outer case, and a plurality of cylindrical lithium ion secondary batteries accommodated in the outer case in vertical N rows and lateral M rows (N rows≦M rows), with a gap between the secondary batteries, the outer case has a draft port opened in a first wall facing an outer circumferential surface of the secondary batteries in the first vertical row, and an exhaust port opened in a second wall positioned at the opposite side of the first wall, in each secondary battery in the first vertical row and the second vertical row, a part of the outer circumferential surface, which is at a shorter distance from the first wall than any other parts, faces the draft port of the outer case.

BRIEF DESCRIPTION OF THE SEVERAL VIEWS OF THE DRAWING

FIG. 6 is a schematic diagram showing an example of an arrangement of a heat equalizing plate arranged in an outer case of the battery pack in FIG. 1.

FIG. 7 is a plan view of the heat equalizing plate in FIG. 6.

FIG. 8 is a plan view showing another example of the heat equalizing plate arranged in the outer case of the battery pack in FIG. 1.

DETAILED DESCRIPTION OF THE INVENTION

Figure 1:
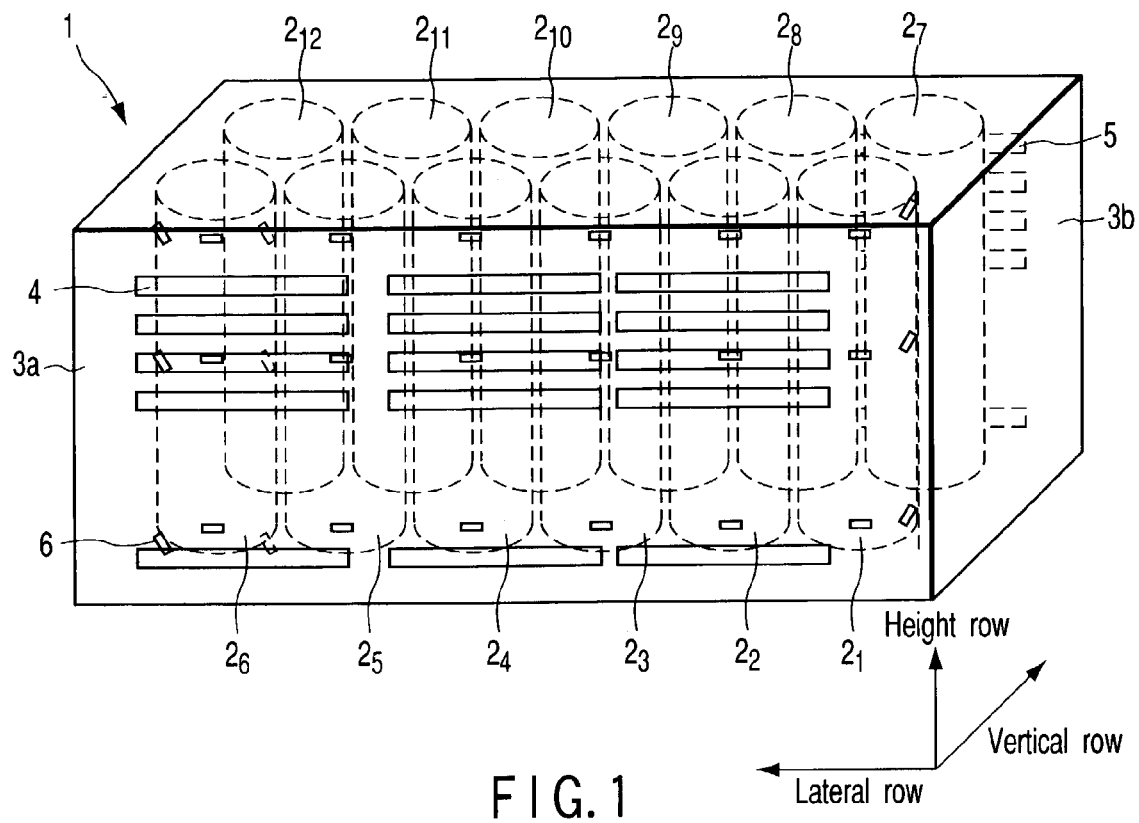
FIG. 1 is a perspective view showing an example of a battery pack of the invention.

A battery pack of the invention will be described below.

The battery pack comprises an outer case, and cylindrical lithium ion secondary batteries accommodated in the outer case in vertical N rows and lateral M rows (N rows≦M rows).

The outer case has a draft port opened in a first wall facing an outer circumferential surface of the secondary batteries in the first vertical row, and an exhaust port opened in a second wall positioned at the opposite side of the first wall.

The secondary batteries are mutually spaced by a gap.

In each secondary battery in the first vertical row, a part of the outer circumferential surface, which is at a shorter distance from the first wall than any other parts, faces the draft port of the outer case.

In each secondary battery in the second vertical row, a part of the outer circumferential surface, which is at a shorter distance from the first wall than any other parts, faces the draft port of the outer case across the gap in the first vertical row.

Now, the matrix of vertical N rows and lateral M rows (N rows≦M rows) will be explained. A row of arranging the cylindrical lithium ion secondary batteries laterally in an upright state is a lateral row, and lateral M rows means there are M pieces of secondary batteries arranged laterally. The lateral rows are arranged in a plurality in the vertical direction. The number of lateral rows arranged in the vertical direction is the number of vertical rows. Vertical N rows means N sets of lateral rows are arranged in the vertical direction. As vertical N row, at least two rows are needed, which should be equal to or smaller than the lateral M rows. If there is only one vertical row, it means that the lithium ion secondary batteries are arranged in one straight lateral line in an upright state, and hence the battery pack of the invention is not composed.

In the battery pack of the invention, cylindrical lithium ion secondary batteries are arranged in an upright state in vertical N rows and lateral M rows (N rows≦M rows), and further the secondary batteries may be stacked up in the axial direction (height direction) of the secondary batteries. The number of layers to be stacked up is one or more. The two-dimensional array of the secondary batteries thus stack up as seen from the axial direction (upper side) of the secondary batteries satisfies the arrangement of vertical N rows and lateral M rows (N rows≦M rows)

In the battery pack of the invention, the gap in the vertical first row includes a gap between the secondary battery positioned at the end of a row and the outer case, and a gap between the secondary batteries.

According to such battery pack, the secondary batteries in the vertical first row and vertical second row can be cooled by concentrating on the draft port side, and the temperature at the draft port side of the secondary batteries can be set lower than the temperature at the exhaust port side. As a result, the diffusion performance of the nonaqueous electrolyte in the secondary batteries can be enhanced, and precipitation and growth of lithium dendrite can be suppressed, and thereby the cycle characteristic in discharge at high rate (hereinafter called high rate cycle characteristic) can be enhanced.

Figure 2:
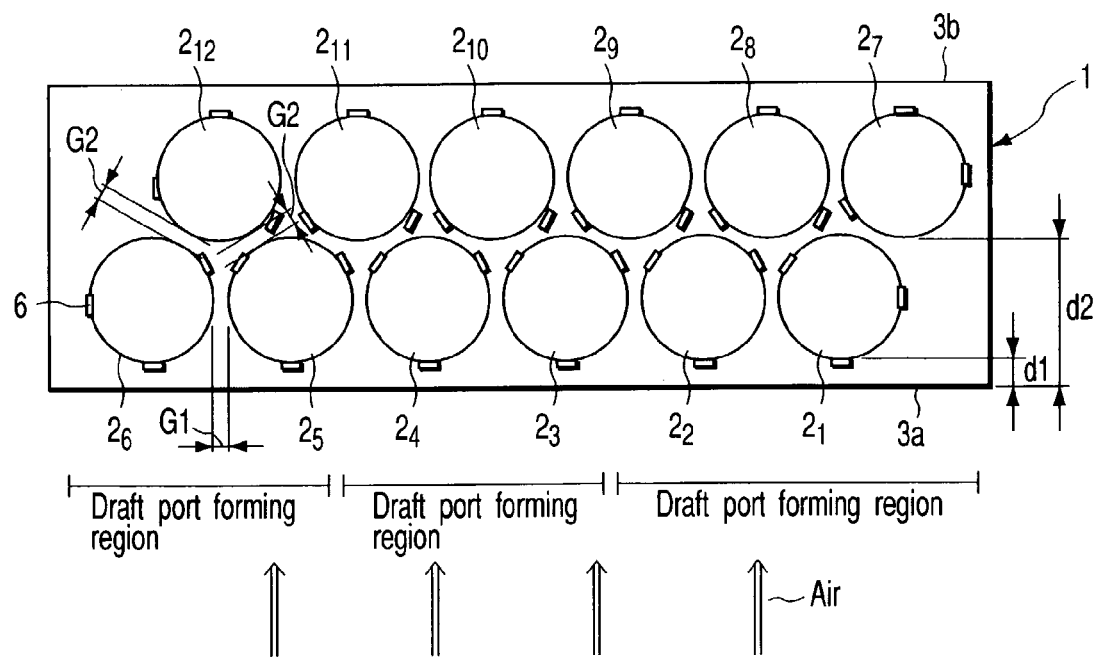
FIG. 2 is a schematic diagram explaining an arrangement of secondary batteries in the battery pack in FIG. 1.
Figure 3:
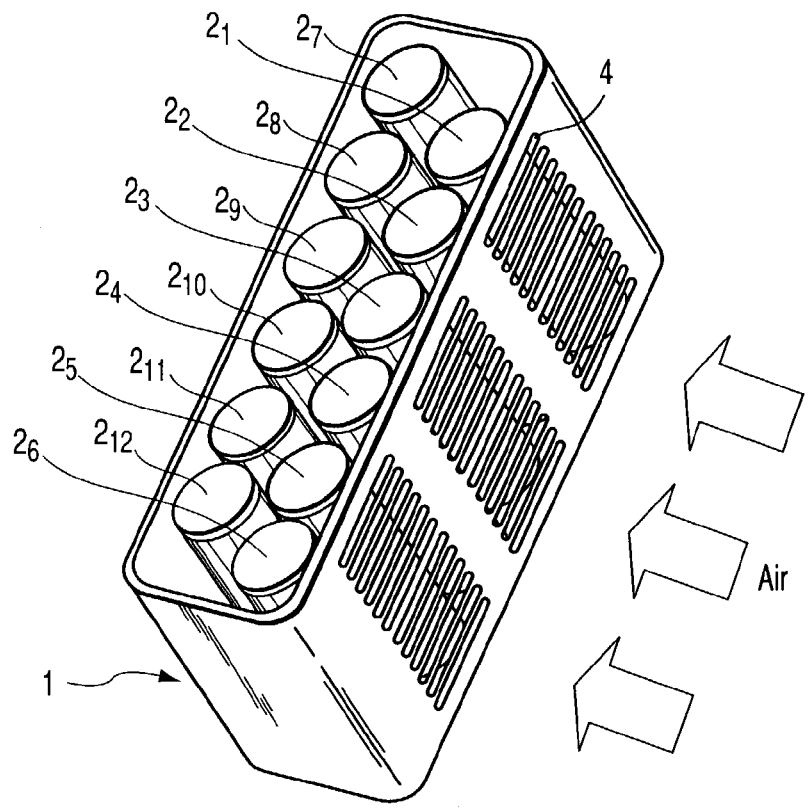
FIG. 3 is a perspective view schematically showing a state of cold air blown to the battery pack in FIG. 1.
Figure 5:
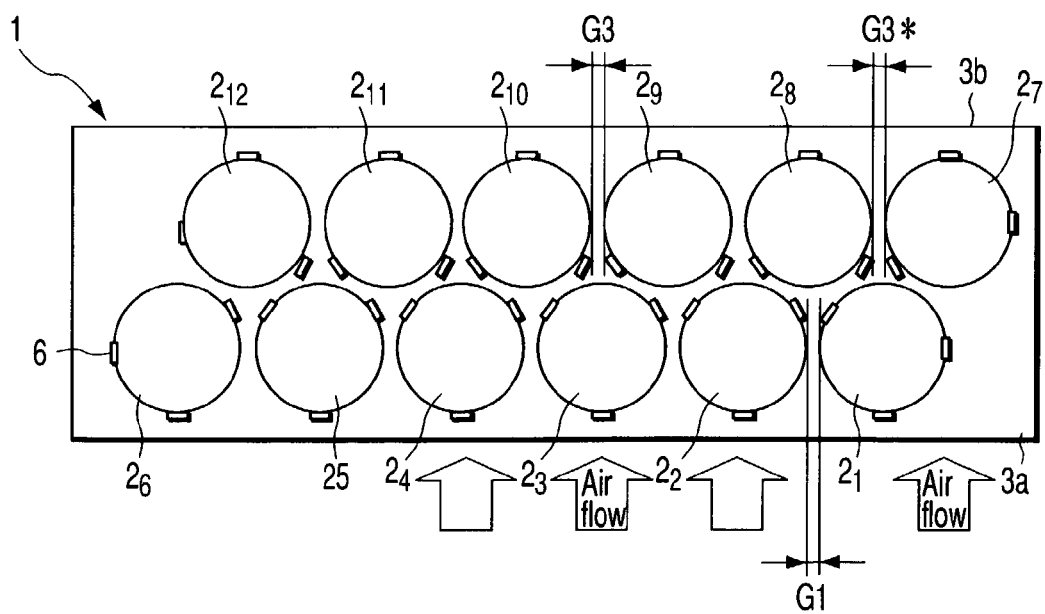
FIG. 5 is another schematic view showing an arrangement of the secondary batteries in the battery pack in FIG. 1.
Figure 4:
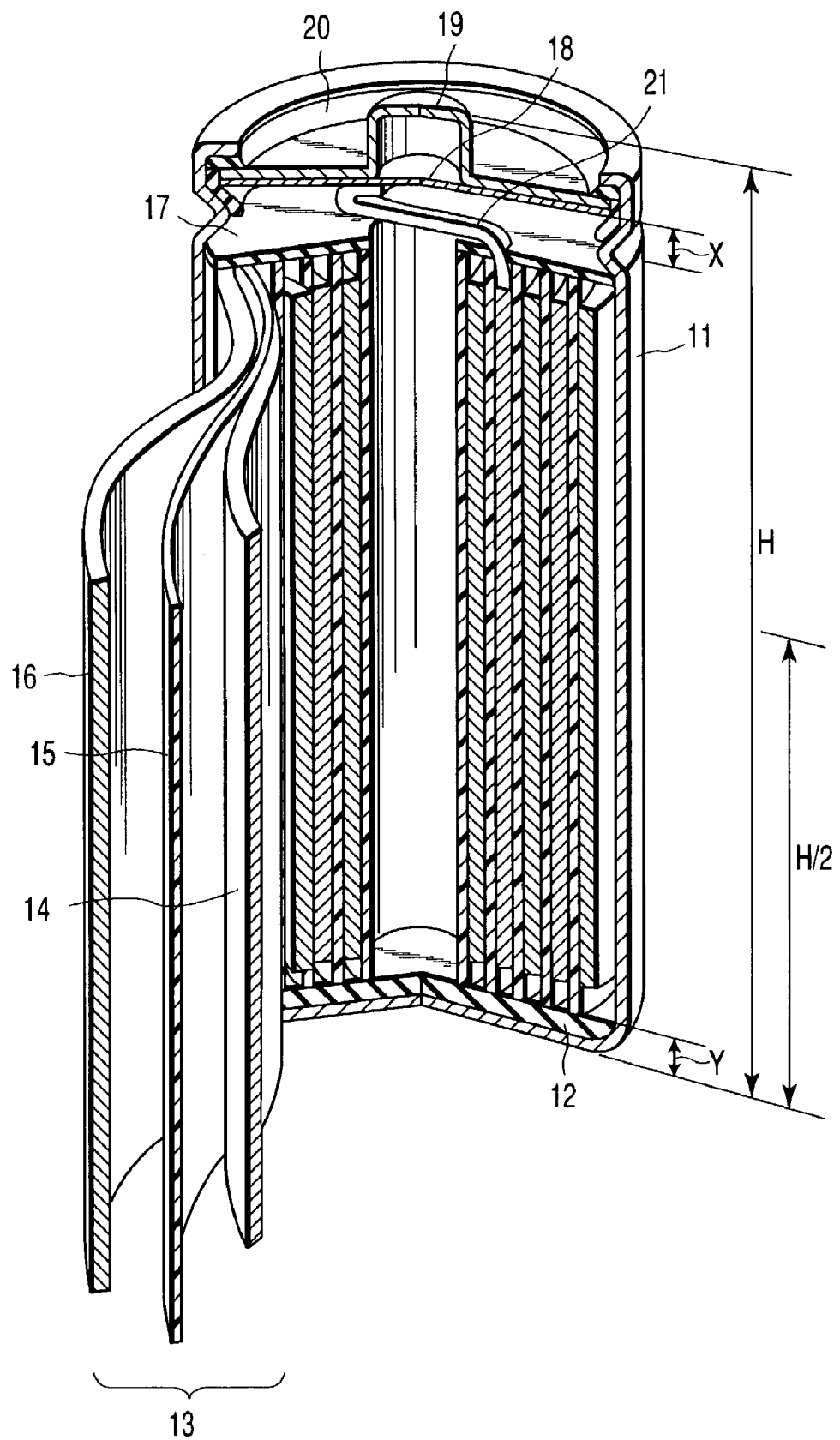
FIG. 4 is a perspective view showing an example of cylindrical lithium ion secondary batteries incorporated in the battery pack in FIG. 1.

An example of the battery pack of the invention is described by referring to FIG. 1 to FIG. 8. FIG. 1 is a perspective view showing an example of the battery pack of the invention. FIG. 2 is a schematic diagram explaining a configuration of secondary batteries in the battery pack in FIG. 1. FIG. 3 is a perspective view schematically showing a configuration of cold air flow and the battery pack in FIG. 1. FIG. 4 is a perspective view showing an example of cylindrical lithium ion secondary batteries incorporated in the battery pack in FIG. 1. FIG. 5 is another schematic view showing a configuration of secondary batteries in the battery pack in FIG. 1. FIG. 6 is a schematic diagram showing an example of a configuration of a heat equalizing plate disposed in an outer case of the battery pack in FIG. 1. FIG. 7 is a plan view of the heat equalizing plate in FIG. 6. FIG. 8 is a plan view showing another example of the heat equalizing plate disposed in the outer case of the battery pack in FIG. 1.

In a rectangular outer case 1, for example, twelve cylindrical lithium ion secondary batteries (unit cells) $2_1$ to $2_{12}$ are accommodated in an upright state. Therefore, the longitudinal direction of the secondary batteries is parallel to the gravitational direction. Two lithium ion secondary batteries (unit cells) connected in parallel composed one unit, and six units are connected in series to compose a battery set. The battery array consists of vertical two rows (N rows)× lateral six rows (M rows). In this example, secondary batteries are not stacked up in the axial direction (height direction). Further, the unit cells $2_1$ to $2_{12}$ in the battery set do not contact with each other, but are mutually spaced across a gap. For composing the battery set, the unit cells are connected by Ni tabs using resistance welding, and this tab connection serves also to fix the arrangement of the unit cells $2_1$ to $2_{12}$, so that the entire battery set is integrated by the outer case 1.

Of the two side walls at the longitudinal side of the outer case 1, the side wall facing the outer circumference of all unit cells $2_1$ to $2_6$ in the vertical first row is supposed to be a first wall 3a, and the side wall positioned at the opposite side of the first wall 3a is supposed to be a second wall 3b. In the first wall 3a, as draft ports, twelve rectangular slits 4 are formed vertically, and three rows are formed laterally. On the other hand, in the second wall 3b, as exhaust ports, twelve rectangular slits 5 are formed vertically, and three rows are formed laterally.

In the unit cells $2_1$ to $2_6$ in the vertical first row, a part of the outer circumferential surface, which is at the shortest distance ($d_1$) from the first wall 3a, is opposite to the draft port 4.

On the other hand, in the unit cells $2_7$ to $2_{12}$ in the vertical second row, a part of the outer circumferential surface, which is at the shortest distance ($d_2$) from the first wall 3a, is opposite to the draft port 4 across the gap existing in the vertical first row. The gap existing in the vertical first row includes gaps existing in the unit cells $2_1$ to $2_6$ and gaps between the unit cell $2_1$ or $2_6$ positioned at the end of a row and the case.

The direction of cold air blow is orthogonal to the longitudinal direction of the unit cells $2_1$ to $2_{12}$ as shown in FIG. 3.

Thermocouples 6 for measuring the temperature distribution in the unit cells are arranged at upper position, middle position and lower position on the outer circumference of the unit cells $2_1$ to $2_{12}$ forming one set, and three sets are arranged on the outer circumference, and the temperature distribution of the entire unit cells can be measured. Therefore, the temperature at the draft port side and exhaust port side can be measured. As such thermocouples 6, K type thermocouples may be used. To avoid complication in the drawings, all thermocouples are not shown in FIGS. 1 and 2.

A specific structure of unit cells $2_1$ to $2_{12}$ is described.

As shown in FIG. 4, a cylindrical container 11 of stainless steel or the like has an insulator 12 disposed in the bottom. An electrode group 13 is contained in the container 11. The electrode group 13 comprises a positive electrode 14, a separator 15, and a negative electrode 16, which are laminated in this sequence to be formed in a spiral structure.

Nonaqueous electrolyte is contained in the container 11. An insulating paper 17 having a hole opened in the center is arranged on the electrode group 13. A sealing member including a PTC element 18 having a hole opened in the center and a positive electrode terminal 19 of hat shape is crimped and fixed to the upper opening of the container 11 by way of an insulating gasket 20. Also, a safety device serving as a gas vent hole (not shown) is incorporated in the positive electrode terminal 19. One end of a positive electrode lead 21 is connected to the positive electrode 14, and the other end to the PTC element 18, respectively. The negative electrode 16 is connected to the container 11 which is the negative electrode terminal by way of a negative electrode lead (not shown).

(Description of Operation)

In the battery pack having such configuration, the air taken in from the draft port 4 of the case 1 can be blown to the most protruding portion of the outer circumference of all unit cells $2_1$ to $2_{12}$ of the vertical first row and vertical second row. As a result, effects explained in (1) and (2) below are obtained, so that the high rate cycle characteristic of the battery pack can be enhanced.

(1) In all unit cells $2_1$ to $2_{12}$, the draft port side can be cooled centrally, and a sufficient temperature difference is provided between the draft port side and the exhaust port side. Consequently, convection can occur in the nonaqueous electrolyte contained in the unit cells, and nuclei of dendrites grown on the negative electrode surface can be dissolved and eliminated by the convection. Further, lithium ions moving from the negative electrode to the positive electrode can be uniformly intercalated in the positive electrode active material, and-hence can be uniformly intercalated in the graphite of the negative electrode at the time of next charging, too, so that growth of dendrite can be suppressed.

(2) Concerning the temperature difference between the draft port side and the exhaust port side, fluctuations can be suppressed in the unit cells $2_1$ to $2_{12}$, and the difference in charging and discharging characteristic in the unit cells $2_1$ to $2_{12}$ can be decreased.

Therefore, the high rate cycle characteristic of the unit cell itself can be enhanced, and fluctuations in high rate cycle characteristics among unit cells can be suppressed, so that a battery pack excellent in high rate cycle characteristic can be realized.

The temperature difference between the draft port side and the exhaust port side of unit cells is preferred to be kept within a range of 2 to 10° K. When the temperature difference is smaller than 2° K, convection of nonaqueous electrolyte hardly occurs. In this case, initially, charging and discharging will be performed in the entire electrode, but in a long cylindrical form, the central portion of the container is swollen by expansion of electrode, and the electrolyte is concentrated in the central area of the electrode, and the charging and discharging cycle life becomes shorter. On the other hand, if the temperature difference is larger than 10° K, discharge in high temperature portion takes place in priority, and Li ions are removed excessively from the high temperature portion, so that the negative electrode is likely to be locally overdischarged. As a result, the copper (Cu) in the current collector is dissolved and precipitated, and dendrites of Cu are formed. The Cu dendrites penetrate through the separator to reach the positive electrode, which may possibly lead to internal short-circuit.

(Gaps G1, G2)

Preferably, gaps G1 and G2 should satisfy the following formulas (1) and (2):

$$0.1 \leq G1 \leq 5 \quad (1)$$

$$0.5G1 \leq G2 \leq G1 \quad (2)$$

wherein G1 is the size (mm) of the gap in the unit cells $2_1$ to $2_6$ in the vertical first row, and G2 is the size (mm) of the gap among the unit cells $2_1$ to $2_6$ in the vertical first row and unit cells $2_7$ to $2_{12}$ in the vertical second row.

Herein, the gap G1 refers to the shortest distance between a unit cell (for example, $2_6$) in the vertical first row, and its adjacent unit cell (for example, $2_5$). On the other hand, the gap G2 refers to the shortest distance between a unit cell (for example, unit cell $2_5$) in the vertical first row, and unit cells (for example, unit cells $2_{12}$ and $2_{11}$) of the vertical second row that opposite to the unit cell (for example, unit cell $2_5$). In other words, the shortest distance between a unit cell (for example, unit cell $2_5$) in the vertical first row and a unit cell (for example, unit cell $2_{10}$) not opposite to this unit cell is not included in this gap G2.

The reason of defining the gap G1 in this range will be explained. When the size of the gap G1 exceeds 5 mm, the size of the battery pack itself is too large, and as compared with the case of a narrower gap, a larger air flow rate is needed to obtain a same air flow velocity. Therefore, a cooling motor of a larger output is needed, which is not practical. It is also possible that the volume efficiency of the battery pack may be lowered. On the other hand, when the size of the gap G1 is smaller than 0.1 mm, the resistance for passing the air flow increases, and a larger motor output is needed to obtain air flow rate and air flow velocity sufficient for cooling the battery, which is not practical. Therefore, a preferred range is 0.5 mm or more to 3 mm or less. The size of the gap G1 may be either equal or different among the unit cells for composing the vertical first row.

Moreover, by defining the size of the gap G2 in a range of $0.5G1 \leq G2 \leq G1$, a sufficient air flow velocity can be obtained so that the draft port side of the unit cells in the vertical second row can be cooled sufficiently. The size of the gap G2 may be either uniform or not uniform.

The size of the gap G1 should be preferably equivalent to 0.38 to 28% of the diameter of the unit cells in a range of 0.1 to 5 mm. By such configuration, it is effective to decrease fluctuations of temperature difference between the draft port side and exhaust port side among unit cells, so that the high rate cycle characteristic of the battery pack can be further enhanced.

(Gap G3)

A gap G3 of the unit cells $2_7$ to $2_{12}$ in the vertical second row may be either equal to or not equal to the gap G1 as shown in FIG. 2. A preferred mode of the gap G3 is explained by referring to FIG. 5. Among the unit cells positioned at the end of the vertical second row, at least a unit cell at one end (for example, unit cell $2_7$) partly projects from the vertical first row, and has a wider area directly exposed to the air flow taken in from the draft port. As a result, it is overcooled as compared with other unit cells in the second row. Therefore, as compared with other unit cells, the discharging characteristic tends to be lowered, which may be a cause of worsening the charging and discharging characteristic as the battery pack.

In the unit cells of the vertical second row, it is preferred to satisfy the following formula (3):

$$0.2G1 \leq G3^* \leq 0.8G1 \quad (3)$$

where G3* is the size (mm) of the gap between a unit cell at an end (for example, unit cell $2_7$) of the unit cells in the vertical second row, and its adjacent unit cell (for example, unit cell $2_8$). The gap G3* may be either one gap or two gaps. The one gap means a gap between a unit cell positioned at one end of the unit cells in the vertical second row, and its adjacent unit cell. The two gaps includes: a gap between a unit cell positioned at one end of the unit cells in the vertical second row, and its adjacent unit cell; and a gap between a unit cell positioned at the other end of the unit cells in the vertical second row, and its adjacent unit cell.

The gap G3 between other unit cells (for example, unit cells $2_8$ to $2_{12}$) in the vertical second row is preferred to be equal to G1. By such configuration, it is effective to decrease the area of the unit cell of the second vertical row that projects from the vertical first row, thereby decreasing the area of the unit cell in the second vertical row directly exposed to the air flow, and overcooling can be lessened, so that the cycle characteristic of the battery pack can be further enhanced.

The size of the gap G3* is preferred to satisfy the following formula (4):

$$0.2G1 \leq G3* \leq 0.5G1 \quad (4)$$

In FIG. 5, meanwhile, to clarify the explanation about the gap G3 and the gap G3*, the draft port forming region, gap G2, and shortest distance $d_1$, $d_2$ are not shown, but the battery pack shown in FIG. 5 has a same configuration as the battery pack shown in FIG. 2.

(Heat Equalizing Plate)

Between the unit cells $2_1$ to $2_6$ in the vertical first row and unit cells $2_7$ to $2_{12}$ in the vertical second row, it is preferred to arrange a heat equalizing plate having ventilation holes. At this time, preferably, the heat equalizing plate should contact with both the unit cells $2_1$ to $2_6$ in the vertical first row and unit cells $2_7$ to $2_{12}$ in the vertical second row. By such configuration, it is effective to decrease fluctuations of the temperature difference between the draft port side and exhaust port side among the unit cells $2_7$ to $2_{12}$ in the vertical second row. Therefore, the high rate cycle characteristic of the battery pack can be further enhanced. Further, by interposing the heat equalizing plate between the unit cells in the vertical first row and unit cells in the vertical second row, vibrations of unit cells can be substantially suppressed as compared with the case without heat equalizing plate. By suppressing vibrations, peeling and separation of the active material from the electrode can be prevented.

The heat equalizing plate may be made of, for example, a metal. A greater mass of the heat equalizing plate has a greater effect to suppress vibrations of unit cells. However, if the mass is too large, the weight of the battery pack increases, which is not preferred. Above all, aluminum is preferred because its density is about 2.7 g/m³, and it satisfies cooling of unit cells in the vertical second row, suppression of vibrations of unit cells, and reduction of weight of battery pack.

The heat equalizing plate may be made of a flat plate, but a corrugated plate is preferred. Examples of using corrugated heat equalizing plate are shown in FIGS. 6 and 7. That is, between the unit cells $2_1$ to $2_6$ in the vertical first row and unit cells $2_7$ to $2_{12}$ in the vertical second row, a heat equalizing plate 31 of corrugated plate shaped along the outer circumference of the unit cells is arranged. This heat equalizing plate 31 has two rectangular slits 32 formed vertically as ventilation holes, and three rows are arranged laterally.

Instead of opening the ventilation holes in the heat equalizing plate as shown in FIGS. 6 and 7, two or more heat equalizing plates may be used, and the gap between the heat equalizing plates may be utilized as ventilation hole. Such example is shown in FIG. 8.

This heat equalizing plate has an upper heat equalizing plate 33 and a lower heat equalizing plate 34. Between the upper part of the unit cells $2_1$ to $2_6$ in the vertical first row and the upper part of the unit cells $2_7$ to $2_{12}$ in the vertical second row, the upper heat equalizing plate 33 having a corrugated shape along the outer circumference of the unit cells is arranged. On the other hand, between the lower part of the unit cells $2_1$ to $2_6$ in the vertical first row and the lower part of the unit cells $2_7$ to $2_{12}$ in the vertical second row, the lower heat equalizing plate 34 having a corrugated shape along the outer circumference of the unit cells is disposed. A gap is provided between the upper heat equalizing plate 33 and the lower heat equalizing plate 34, and this gap functions as the ventilation hole.

(Outer Case)

The outer case is formed of, for example, plastic, metal or thermoplastic resin film. The outer case may be formed by resin mold processing such as injection molding.

(Draft Port and Exhaust Port)

The total area of the openings of the draft port is preferred to be equivalent to 10 to 80% of the first wall of the outer case. If the total area of the openings of the draft port is less than 10% of the first wall of the outer case, cooling of secondary battery is insufficient, and it may be hard to enhance the high rate cycle characteristic of the battery pack. On the other hand, if the total area of the openings of the draft port is more than 80% of the first wall of the outer case, it is hard to integrate plural batteries, or it may raise the risk of electric shock or short-circuiting by contacting with connections for coupling the electrode terminals. A more preferred range of the total opening area of the draft port is 15 to 80% of the first wall of the outer case, and most preferably, 20 to 80%. The area of individual openings of the draft port may be either uniform or not uniform.

The total area of the openings of the exhaust port is preferred to be equivalent to 10 to 80% of the second wall of the outer case owing to the same reasons as in the case of the draft port. A more preferred range of the total opening area of the exhaust port is 15 to 80% of the second wall, and most preferably 20 to 80%. The area of individual openings of the exhaust port may be either uniform or not uniform.

In FIG. 1, the shapes of the draft port and exhaust port are rectangular, but the shapes of the draft port and exhaust port are not limited to rectangular form, but may include any form as far as the unit cells can be cooled sufficiently. For example, the ports may be formed in circular, elliptical or triangular shape. The openings of the draft port may be formed in a same shape, or different shapes may be combined. It is the same in the case of the shape of the exhaust port.

In FIG. 1, slits (lateral slits) are formed parallel to the longitudinal direction of the outer case, but vertical slits may be used, the vertical slits can be formed parallel to the lateral direction of the outer case.

In FIG. 1, 36 slits are formed in both the draft port and exhaust port, but the number of slits is not specified, and a proper number of slits may be formed in consideration of the size of the outer case, size and number of unit cells, cooling speed, and safety.

(Outer Case Having Recesses Formed in a Inner Face thereof)

A first recess in which the upper end portion of the unit cell is accommodated is preferably formed in the inside of the upper panel of the outer case, and a recess in which the lower end portion of the unit cell is accommodated in the inside of a bottom panel. Such outer case should satisfy the following formula (5):

$$d < D \quad (5)$$

where d is the depth (mm) of the first recess, and D is the depth (mm) of the second recess.

In the outer case satisfy the formula (5), since the depth D of the second recess is greater than the depth d of the first recess, the air flow rate blown to the lower end portion of the unit cell can be decreased as compared with the upper end portion. As a result, the lower end portion of the unit cell is not cooled too much, and the temperature of the lower end portion of the unit cell can be set higher than the temperature of the upper end portion, and convection of the nonaqueous electrolyte is more likely to be induced. Hence, precipitation and growth of lithium dendrite can be suppressed, and thereby the high rate cycle characteristic of the battery pack can be further enhanced.

Figure 9:
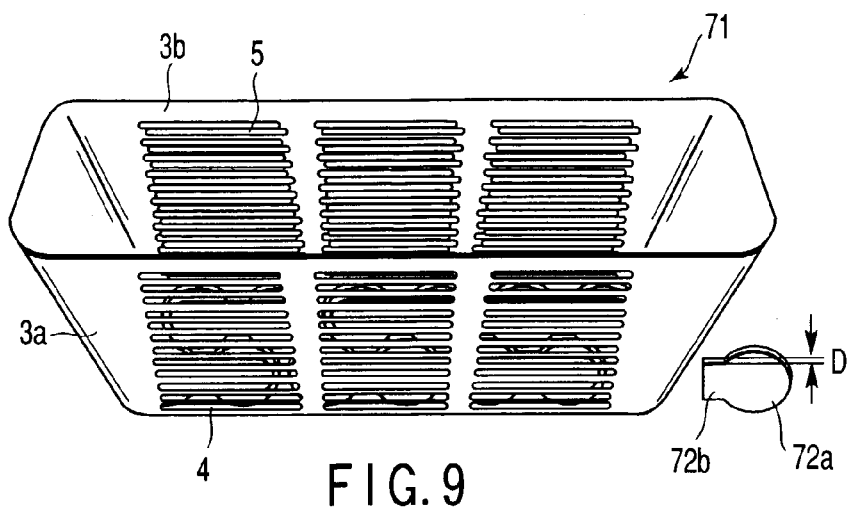
FIG. 9 is a perspective view showing an example of an outer case main body of the outer case for use in the battery pack of the present invention.
Figure 10:
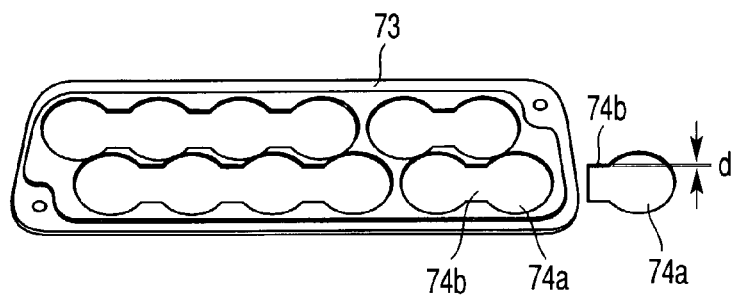
FIG. 10 is a perspective view showing an example of a lid plate arranged in the case main body in FIG. 9.
Figure 11:
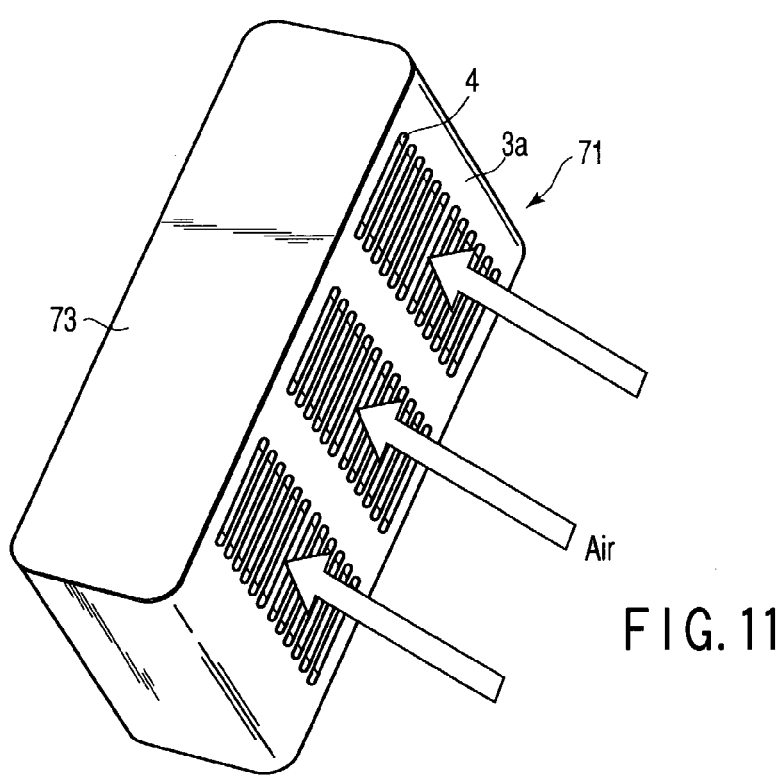
FIG. 11 is a perspective view schematically showing a state of cold air blown to the battery pack comprising the case main body in FIG. 9 and the lid section in FIG. 10.

Examples of the outer case satisfying the formula (5) are shown in FIG. 9 to FIG. 11. FIG. 9 is a perspective view showing an example of a case main body of the outer case used, FIG. 10 is a perspective view showing an example of a lid plate of the outer case, FIG. 11 is a perspective view schematically showing a state of cold air blown to the battery pack having the outer case shown in FIG. 9 and the lid plate in FIG. 10. Same parts as in FIGS. 1 and 2 are identified with same reference numerals, and duplicate explanation is omitted.

As shown in FIG. 9, rectangular slits 4 are formed as the draft port in the first wall 3a of an outer case main body 71 of a long box shape. In the second wall 3b, on the other hand, rectangular slits 5 are formed as the exhaust port. Inside the bottom of the case main body 71, a second circular recess 72a in which the negative or positive electrode terminals of the unit cells $2_1$ to $2_{12}$ are accommodated is formed. A groove 72b is formed in the second circular recess 72a for holding the leads connecting the unit cells.

On the other hand, as shown in FIG. 10, inside of a lid plate 73 arranged at the opening of the case main body 71, a first circular recess 74a in which the positive or negative electrode terminals of the unit cells $2_1$ to $2_{12}$ are accommodated is formed. A groove 74b is formed in the first recess 74a for holding the leads connecting the unit cells. The lid plate 73 and case main body 71 are integrated by means of screw or snap fastener. The depth d of the first circular recess 74a and the depth D of the second circular recess 72a similarly satisfy the formula (5). In FIG. 9 to FIG. 11, if the negative electrode terminals of unit cells are accommodated in the second recess, positive electrode terminals of unit cells are accommodated in the first recess. And, if the positive electrode terminals of unit cells are accommodated in the second recess, negative electrode terminals of unit cells are accommodated in the first recess.

Figure 12:
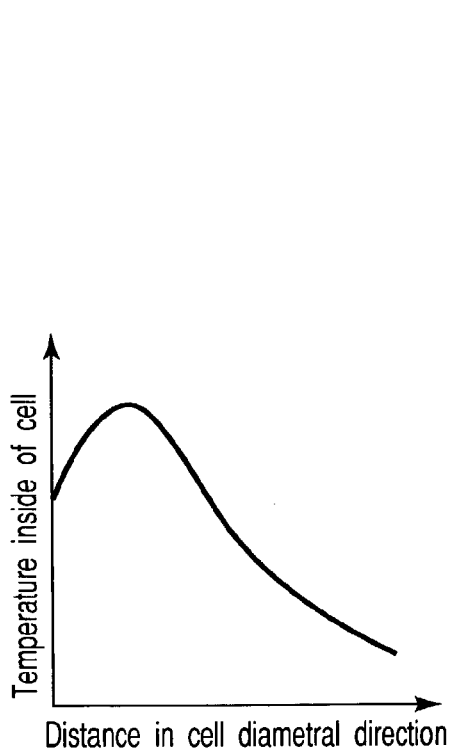
FIG. 12 is a characteristic diagram showing an example of distribution of cell internal temperature in the diametral direction of unit cells.
Figure 13:
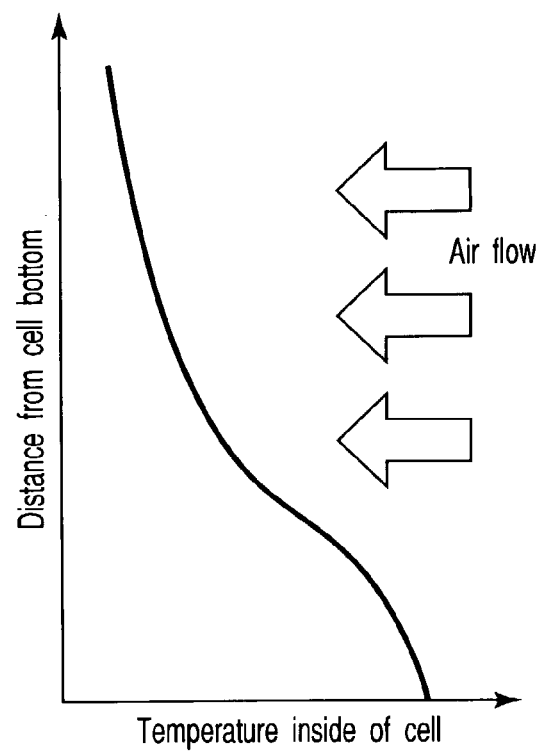
FIG. 13 is a characteristic diagram showing an example of distribution of cell internal temperature in the longitudinal direction of unit cells.
Figure 14:
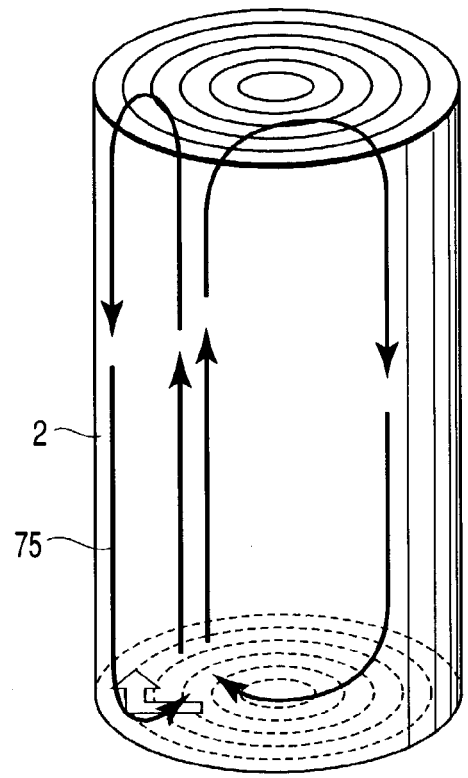
FIG. 14 is a schematic diagram showing an example of a state in which nonaqueous electrolyte is convected in cylindrical lithium ion secondary batteries.

As shown in FIG. 11, when air flow is blown to the battery pack from a direction orthogonal to the longitudinal direction of the unit cell, same as explained in FIG. 1, temperature difference occurs between the draft port side and exhaust port side, and convection of nonaqueous electrolyte is induced. An example of distribution of cell internal temperature in the diametral direction of unit cells is shown in FIG. 12. It is understood from FIG. 12 that the temperature on the outer circumference of the draft port side of the unit cell is lower than inside of the cell. Besides, since air flow is hardly blown to the bottoms of the unit cells accommodated in the second recess 72a, the cooling degree can be lowered. Therefore, as shown in FIG. 13, the cell internal temperature is higher at a position closer to the bottoms of unit cells, and hence convection of nonaqueous electrolyte is also induced in a direction indicated by arrow 75 in the unit cell 2 as shown in FIG. 14. As a result, the nonaqueous electrolyte flows all the time, and nuclei for dendrite precipitation of lithium metal are hardly formed, and if nuclei are formed, they are dissolved in the flowing electrolyte and are soon extinguished, or a hardly growing environment may be formed. Thus, the high rate cycle characteristic of the battery pack can be further enhanced.

Moreover, since the unit cells can be fixed inside of the outer case by the second recess 72a and first recess 74a, if the battery pack vibrates, application of excessive force on the junction of the tabs and cells can be avoided. As a result, trouble of disconnection of tabs from cells does not take place.

In FIG. 9 to FIG. 11, recesses are formed in both inside of the bottom of the case main body 71 and inside of the lid plate 73, but if the depth D of the second recess 72a inside of the bottom of the case main body 71 is sufficient, the unit cells can be fixed and cooled without forming recess inside of the lid plate 73.

(Outer Case Provided With Draft Port Non-Forming Region)

Figure 15:
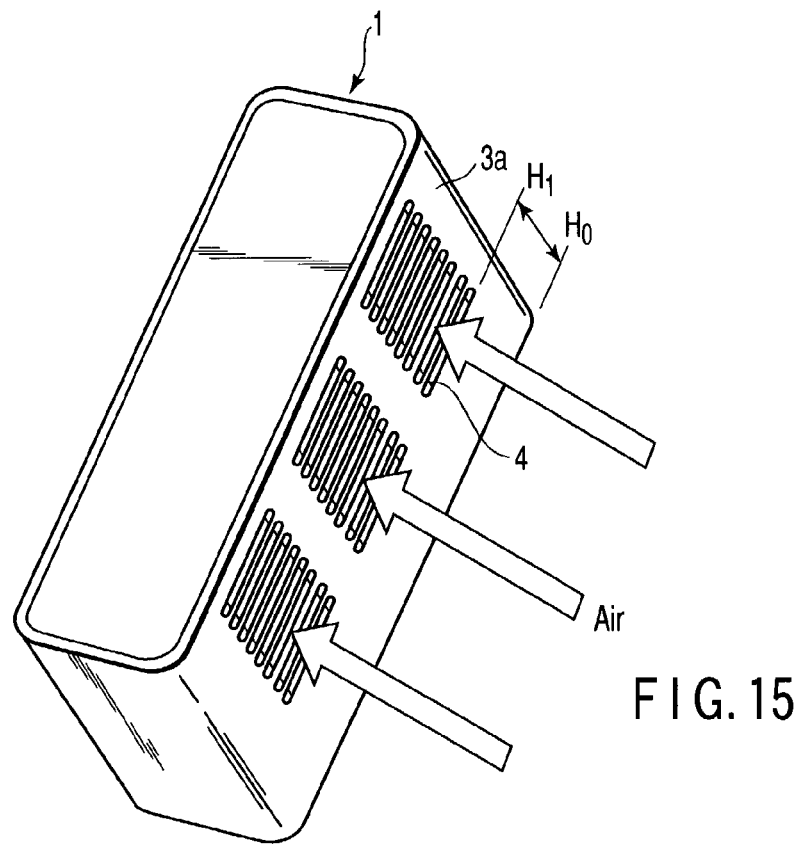
FIG. 15 is a perspective view schematically showing a state of cold air blown to a battery pack in another embodiment of the invention.

Without forming recess, similar effects as shown in FIG. 9 to FIG. 11 can be obtained by using an outer case as shown in, for example, FIG. 15. For this purpose, it is preferred to keep a draft port non-forming region in an area from the lower end $H_0$ of the first wall 3a of the outer case 1 to a position ($H_1$). It is preferred for a height of the position ($H_1$) from the lower end $H_0$ to be 25% or less of the height of the outer case. By such configuration, the lower side of the unit cells is hardly cooled, and the cooling degree is higher in the upper side, so that the temperature distribution as shown in FIG. 13 can be formed. As a result, the convection of the nonaqueous electrolyte as shown in FIG. 14 can be formed, and the high rate characteristic of the battery pack can be further enhanced. A preferred range of height of the position ($H_1$) is 20% or less of the height of the outer case.

(Outer Case Having Ventilation Holes Formed Therein)

It is possible to form a ventilation hole in at least one of the upper panel of the outer case and the bottom panel of the outer case. As a result, the cooling degree in the end portion of the unit cells can be set larger, and the temperature of the end portion of the unit cells can be set lower. Accordingly, the convection of the nonaqueous electrolyte as shown in FIG. 14 can be induced, and the high rate characteristic of the battery pack can be further enhanced. Such example of outer case is shown in FIG. 16.

Figure 16:
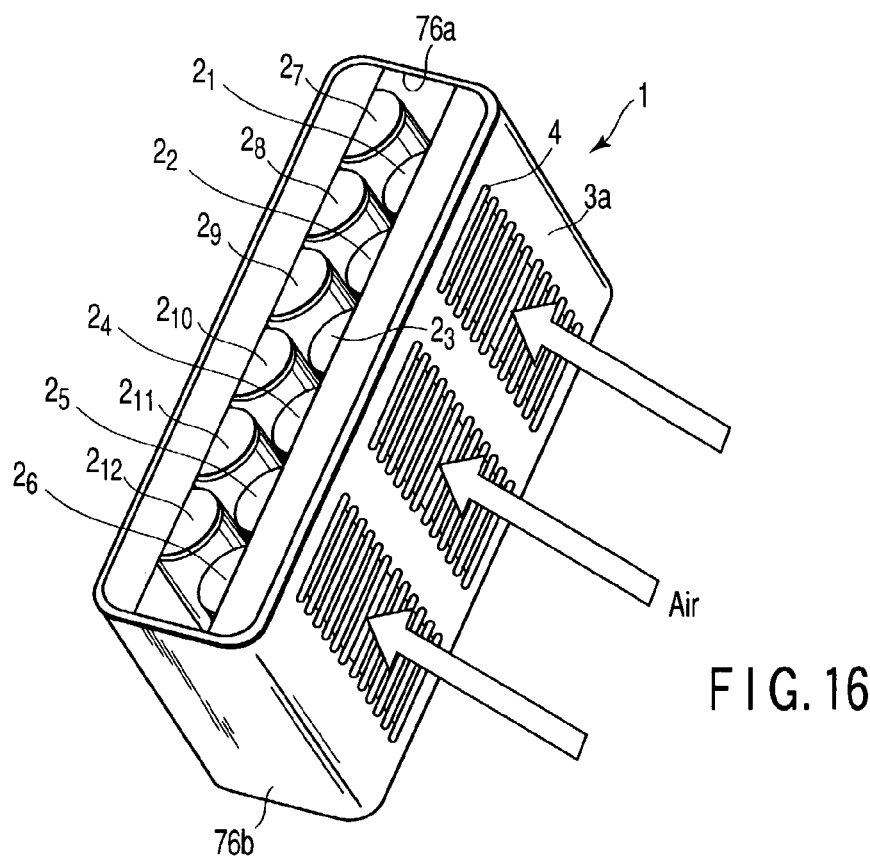
FIG. 16 is a perspective view schematically showing a state of cold air blown to a battery pack in a different embodiment of the invention.
Figure 17:
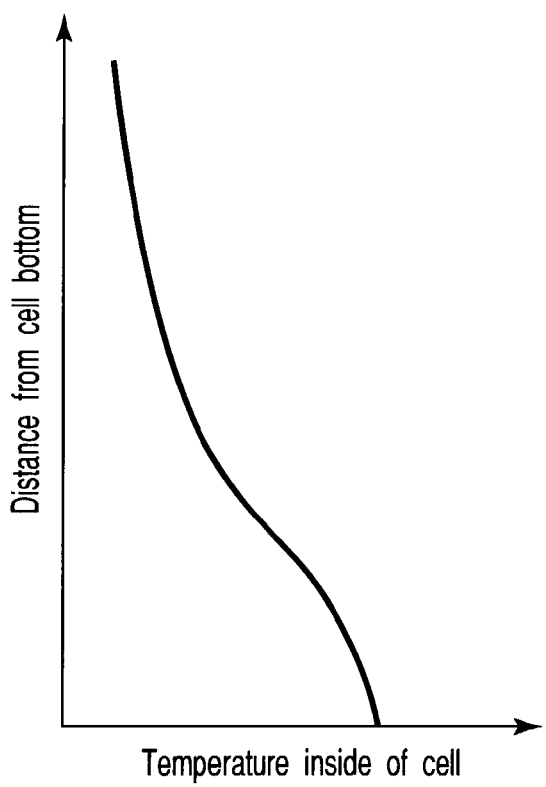
FIG. 17 is a characteristic diagram showing another example of distribution of cell internal temperature in the longitudinal direction of unit cells.
Figure 18:
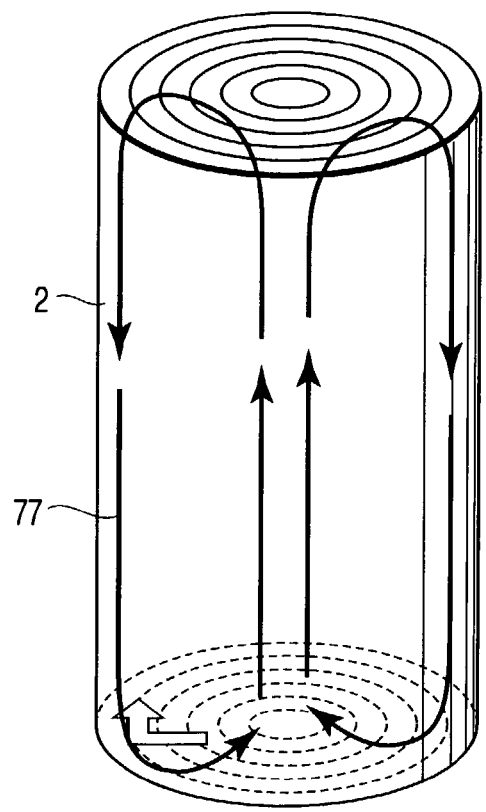
FIG. 18 is a schematic diagram showing another example of a state in which nonaqueous electrolyte is convected in cylindrical lithium ion secondary batteries.

As shown in FIG. 16, by forming a rectangular slit 76a as a first ventilation hole in the top of the outer case 1, and forming a rectangular slit 76b (not shown) as a second ventilation port in the bottom thereof, the area of the cells $2_1$ to $2_{12}$ closer to the upper side is cooled sufficiently, but the area of the cells $2_1$ to $2_{12}$ closer to the bottom is lower in the cooling degree because the air flow is warmed while passing through the battery pack. Therefore, a temperature distribution is formed as shown in FIG. 17, in which the temperature is lower in the portion closer to the upper side of the outer case and the temperature is higher in the cell portion closer to the bottom side of the outer case. As a result, as shown in FIG. 18, convection of the nonaqueous electrolyte in the unit cells 2 is formed also in the direction of arrow 77. Therefore, since the nonaqueous electrolyte is flowing all the time, nuclei for dendrite precipitation of lithium metal are hardly formed, and an environment may be formed in which even if nuclei are formed, they are dissolved in the flowing electrolyte and are soon extinguished, or hardly are grown. Thus, the high rate cycle characteristic of the battery pack can be further enhanced.

(Outer Case Made of Composite Material)

By forming the shell of the outer case, that is, a third wall opposite to the outer circumference of the secondary batteries of the vertical first row to vertical N-th row, a fourth wall positioned at the opposite side of the third wall, and the first wall and second wall, individually by at least one metal selected from the group consisting of aluminum, aluminum alloy, magnesium, magnesium alloy, titanium, titanium alloy, iron, iron alloy, and stainless steel, the thermal conductivity of the shell of the outer case can be enhanced. Therefore the central part of the unit cells can be cooled sufficiently so that the temperature in the upper end portion and lower end portion of unit cells can be set higher than that in the central portion. As a result, convection of nonaqueous electrolyte is also formed in the longitudinal direction, and the high rate cycle characteristic of the battery pack can be further enhanced. Also, fluctuations in distribution of temperature difference among unit cells can be suppressed, so that fluctuations in discharge characteristics among unit cells can be suppressed.

When the top and bottom panels of the outer case are formed of resin, the temperature difference between the lower end portion and the center on the cell unit can be sufficiently large, so that the high rate cycle characteristic of the battery pack can be further enhanced.

Figure 19:
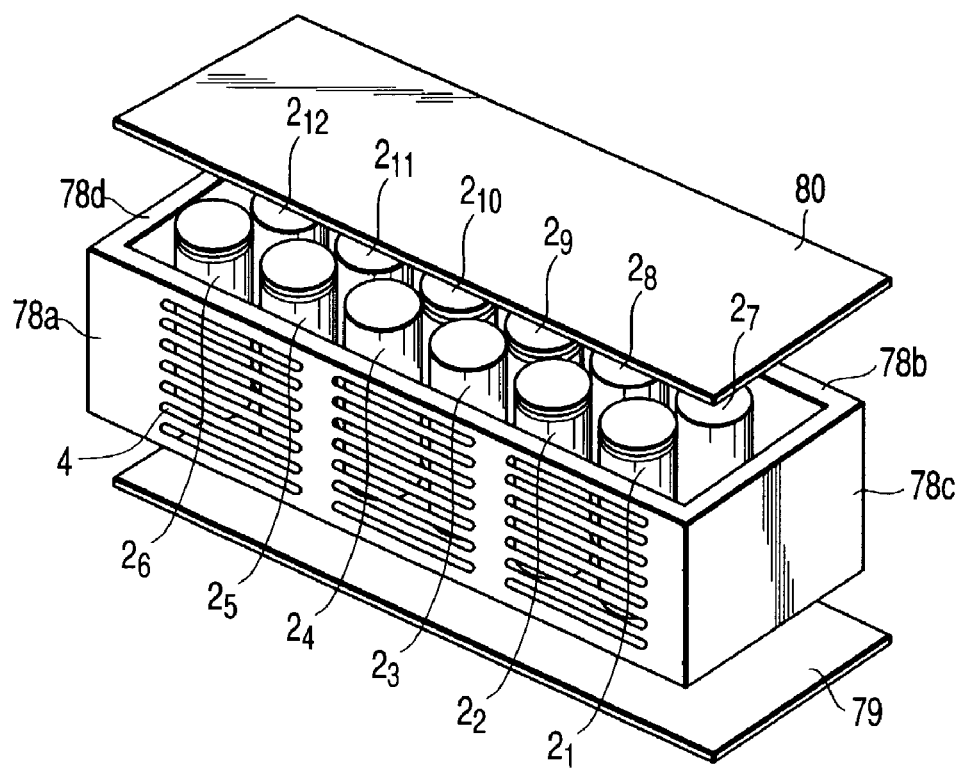
FIG. 19 is a perspective view schematically showing a further embodiment of the battery pack of the invention.

FIG. 19 shows an example of a battery pack having an outer case formed of such composite material. Shell parts of the outer case, that is, a first wall 78a, a second wall 78b, a third wall 78c facing the outer circumference of the unit cells of the vertical first and second rows, and a fourth wall 78d facing the outer circumference of the unit cells of the vertical first and second rows, are made of at least one metal selected from the group consisting of aluminum, aluminum alloy, magnesium, magnesium alloy, titanium, titanium alloy, iron, iron alloy, and stainless steel. On the other hand, a bottom panel 79 and a lid plate 80 are formed of resin.

(Corrugated Outer Case)

Figure 20:
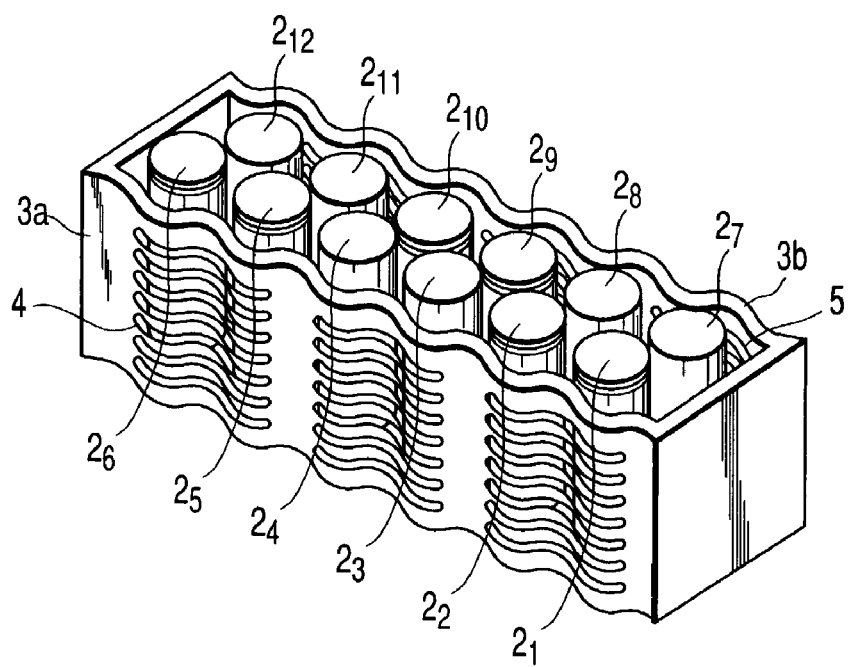
FIG. 20 is a perspective view schematically showing a further embodiment of the battery pack of the invention.
Figure 21:
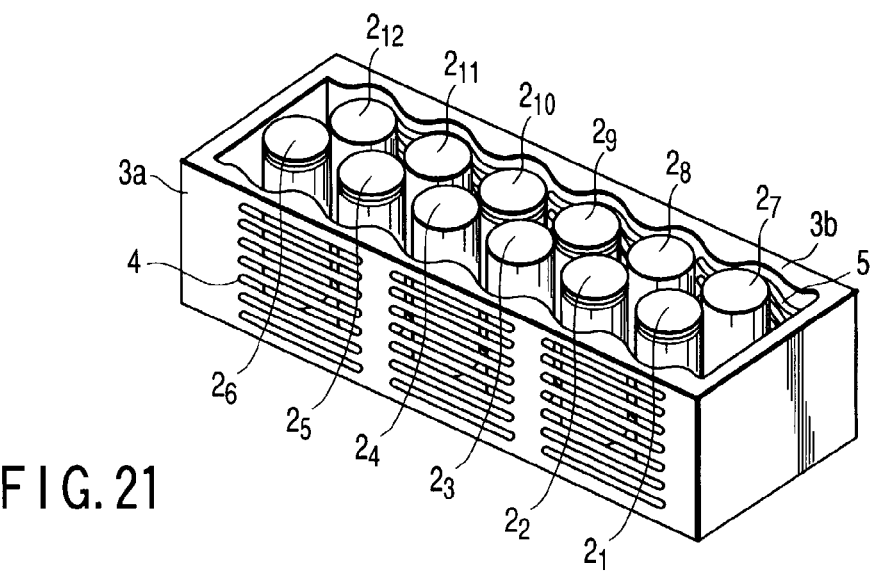
FIG. 21 is a perspective view schematically showing a further embodiment of the battery pack of the invention.

At least the first wall of the outer case is preferred to have a corrugated inner surface. In this case, either the entire face may be corrugated, or only the inner side contacting with the batteries may be corrugated. Accordingly, the unit cells in the vertical first row can be fixed inside of the first wall, and the draft port side surface of the unit cells can be cooled sufficiently. If at least the inner side of the second wall is corrugated, the unit cells in the vertical N-th row can be fixed inside of the second wall, so that the cooling efficiency of the unit cells can be further enhanced. Examples of corrugated outer case are shown in FIGS. 20 and 21. Same parts as explained in FIG. 1 are identified with same reference numerals and duplicate explanation is omitted. FIG. 20 shows an example in which the first wall 3a and second wall 3b is a corrugated wall. In this corrugated wall, the corrugating direction is parallel to the longitudinal direction of the outer case. The unit cells $2_1$ to $2_6$ in the vertical first row are fixed in the corrugated recesses of the first wall 3a. The unit cells $2_7$ to $2_{12}$ in the vertical second row are fixed in the corrugated recesses of the second wall 3b. On the other hand, FIG. 21 shows an example in which the inner surface of the first wall 3a contacting with the batteries and the inner surface of the second wall 3b contacting with the batteries are corrugated surfaces. The unit cells $2_1$ to $2_6$ in the vertical first row are fixed in the corrugated recesses in the inside of the first wall 3a. The unit cells $2_7$ to $2_{12}$ in the vertical second row are fixed in the corrugated recesses in the inside of the second wall 3b.

In foregoing FIG. 20 and FIG. 21, the unit cells are accommodated in the outer case with the longitudinal direction of unit cells parallel to the gravitational direction. When the unit cells are put in the outer case with the longitudinal direction of the unit cells orthogonal to the gravitational direction, it is preferred to keep the corrugating direction of the corrugated surface parallel to the height direction of the outer case.

(Outer Case Coated with Vibration Absorbing Material)

Preferably, at least part of the outer case should be coated with a vibration absorbing material for damping vibration. Hence, the capacity drop of the unit cells can be suppressed. Examples of vibration absorbing material include urethane rubber, natural rubber, gel silicone and the like.

Figure 22:
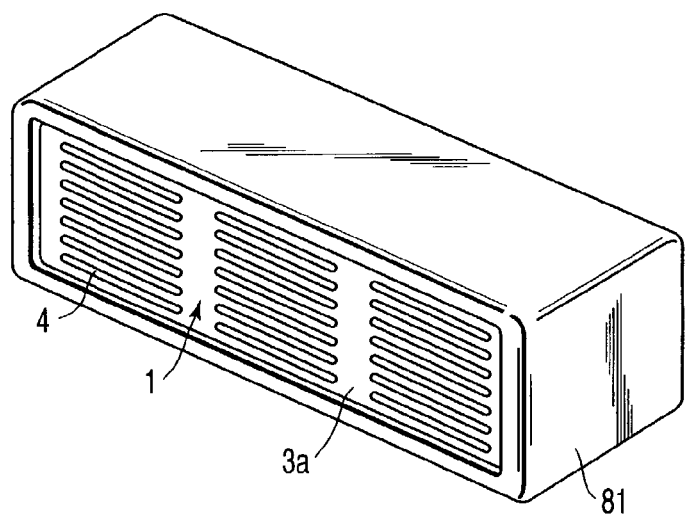
FIG. 22 is a perspective view schematically showing a further embodiment of the battery pack of the invention.
Figure 23:
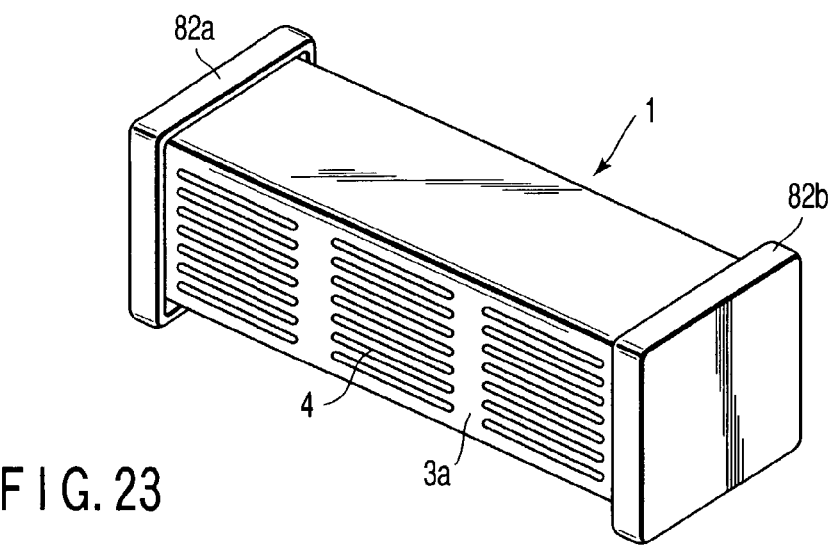
FIG. 23 is a perspective view schematically showing a further embodiment of the battery pack of the invention.
Figure 24:
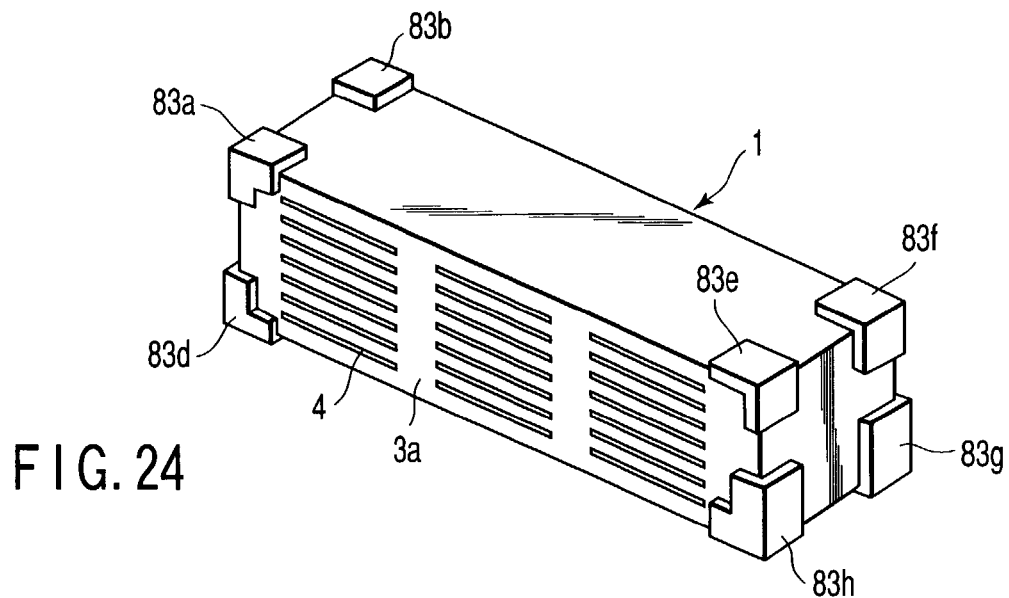
FIG. 24 is a perspective view schematically showing a further embodiment of the battery pack of the invention.
Figure 25:
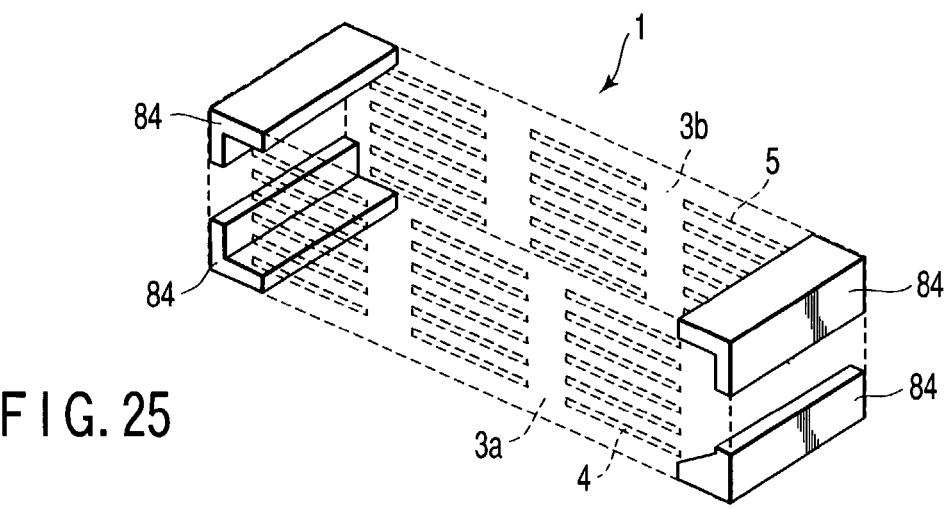
FIG. 25 is a perspective view schematically showing a further embodiment of the battery pack of the invention.
Figure 26:
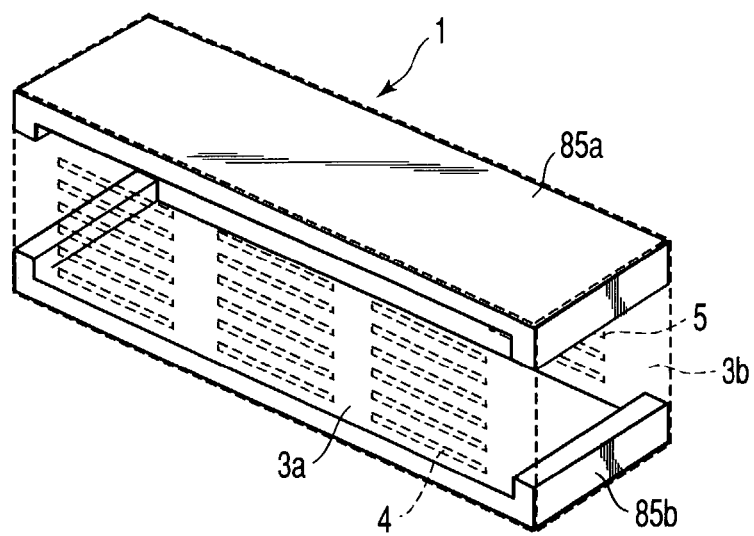
FIG. 26 is a perspective view schematically showing a further embodiment of the battery pack of the invention.

That is, the positive electrode and negative electrode are substantially formed by carrying electrode material on the current collector of metal foil or the like. The electrode material is adhered to the current collector by the binder contained therein. However, when a large impact is applied to the unit cells, or a small vibration is applied for a long period, the electrode material is peeled from the current collector so that the capacity of unit cells is lowered. Accordingly, by coating at least part of the surface and inside of the outer case with a vibration absorbing material for damping vibration, vibration applied to the unit cells can be lessened, so that the decline of the capacity of unit cells can be suppressed. Examples of the outer case using vibration absorbing material are shown in FIG. 22 to FIG. 26. FIG. 22 shows an example of coating the top, bottom, third and fourth walls of the outer case 1 with a vibration absorbing material 81. FIG. 23 shows an example of coating the third and fourth walls of the outer case 1 with vibration absorbing materials 82a, 82b. FIG. 24 shows an example of coating eight corners of the outer case 1 with vibration absorbing materials 83a, 83b, 83c (not shown), 83d, 83e, 83f, 83g and 83h. FIG. 25 shows an example of coating the lateral direction corners of the outer case 1 with a vibration absorbing material 84 from the inside. FIG. 26 shows an example of coating the inside of the top and inside of the bottom of the outer case 1 with vibration absorbing materials 85a, 85b.

(Temperature Distribution)

The unit cells $2_1$ to $2_6$ in the vertical first row are preferred to have a temperature distribution (dispersion) in which a temperature difference between the higher and lower temperatures ranges from 2 to 10° K. When the temperature difference is smaller than 2° K, convection of nonaqueous electrolyte is hardly induced. In this case, initially, the entire electrodes are engaged in charging and discharging, but in slender cylindrical lithium ion secondary batteries, the central part of the can is swollen by expansion of electrodes. Therefore, the electrolyte is likely to gather in the central portion of electrodes, and charging and discharging reaction is concentrated in the central area of electrodes, so that the charging and discharging cycle may be shortened. On the other hand, when the temperature difference is larger than 10° K, discharge occurs dominantly in the high temperature area, and Li ions are desorbed excessively from the high temperature area, and the negative electrodes are locally overdischarged. As a result, the copper (Cu) in the current collector is dissolved and precipitated to form dendrite of Cu, and when it penetrates through the separator to reach the positive electrode, an internal short-circuit may be caused. A further preferred range of the temperature difference is 2 to 7° K, and more preferably 3 to 7° K.

In the battery pack of which unit cells in the vertical first row have a temperature distribution of 2 to 10° K, fluctuations of convection speed of nonaqueous electrolyte among unit cells can be decreased, and fluctuations of performance among unit cells can be suppressed, so that the high rate cycle characteristic of the battery pack can be further enhanced. From the viewpoint of improving the high rate cycle characteristic of the battery pack, the unit cells in the vertical second row are also preferred to have a temperature distribution of temperature difference of 2 to 10° K. Most preferably, in particular, all unit cells composing the battery pack should have a temperature distribution in which a temperature difference between the higher and lower temperatures ranges from 2 to 10° K.

The method of measuring the temperature distribution of unit cells will be explained.

Figure 27:
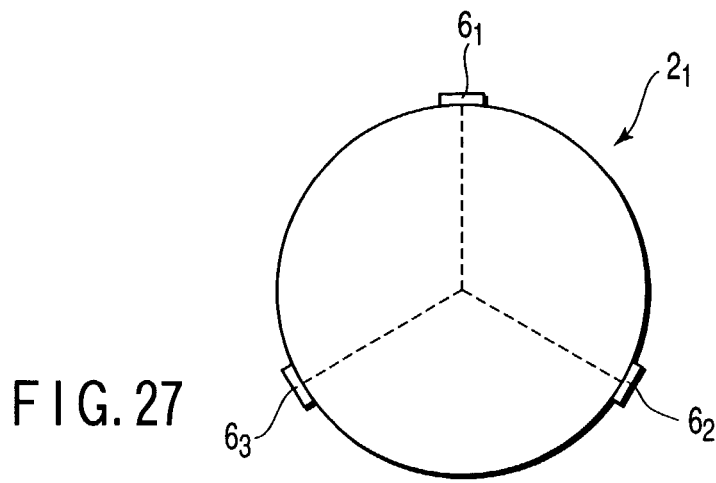
FIG. 27 is a top view schematically showing an example of a cylindrical lithium ion secondary battery having a thermocouple attached thereon.

In each one of unit cells $2_1$ to $2_6$, as shown in FIG. 4 and FIG. 27, a first upper thermocouple $6_1$ is fixed at a position of X mm from the lower side of the flange of the positive electrode terminal 19, and a second upper thermocouple $6_2$ is fixed at a position 120° remote from the first upper thermocouple $6_1$. Further, a third upper thermocouple $6_3$ is fixed at a position 120° remote from the second upper thermocouple $6_2$. As shown in FIG. 4, moreover, a first lower thermocouple is fixed at a position Y mm remote from the bottom of the container 11 and at same angle as the first upper thermocouple. A second lower thermocouple is fixed at a position 120° remote from the first lower thermocouple, and a third lower thermocouple is fixed at a position further 240° remote therefrom. On the other hand, as shown in FIG. 4 described, a first intermediate thermocouple is fixed at a position of half of total height H of each unit cell (H/2) and at same angle as the first upper thermocouple. A second intermediate thermocouple is fixed at a position 120° remote from the first intermediate thermocouple, and a third intermediate thermocouple is fixed at a position further 240° remote therefrom. Distance X and distance Y should be preferably varied depending on the size of the battery pack. In the battery pack for use in the rechargeable vacuum cleaner and electric-assisted bicycle, distance X and distance Y should be preferably set at 5 mm. On the other hand, in the battery pack for use in electric vehicle and hybrid type car, distance X and distance Y should be preferably set at 10 mm. As thermocouples, for example, K type thermocouples may be used.

Measuring the temperature of nine thermocouples provided in the each of unit cells $2_1$ to $2_6$, an arbitrary one is selected as a reference thermocouple, and the temperature difference between the reference thermocouple and other eight thermocouples is determined, respectively. When the obtained data of eight temperature difference values are within a range of 2 to 10° K, it is known that the unit cells have a temperature distribution of temperature difference of 2 to 10° K.

(Size of Battery Set)

The size of battery set varies with the application and specification. For example, when using unit cells with capacity of 1.6 Ah and 18650 size, in the case of a cordless cleaner with an input of 160 W, two unit cells are connected in parallel to form one unit, and six units are connected in series, so that hence the size of the battery set is 135 mm in width×65 mm in height×33 mm in depth. When the power is increased to an input of 300 W, two unit cells are connected in parallel to form one unit, and ten units are connected in series, so that hence the size of the battery set is approximately 225 mm in width×65 mm in height×33 mm in depth. Hence, when the battery pack is used in the rechargeable vacuum cleaner, the size of the battery set (occupying volume of the battery set) is preferred to be in a range of 135 mm to 250 mm in width in the longitudinal direction, 33 mm to 50 mm in width in the lateral direction, and 65 mm to 130 mm in height.

In an electric-assisted bicycle using a direct-current motor of rated output of 235 W, three unit cells are connected in parallel to form one unit, and seven units are connected in series to form a battery set, and in this case, the size of the battery set is about 175 mm in width×65 mm in height×50 mm in depth. Therefore, when the battery pack is used in the electric-assisted bicycle, the size of the battery set (occupying volume of the battery set) is preferred to be in a range of 175 mm to 350 mm in width in the longitudinal direction, 33 mm to 50 mm in width in the lateral direction, and 65 mm to 130 mm in height.

Additionally, in a hybrid type car using a motor of 30 kW, five unit cells of 35 mm in diameter, 200 mm in length, and 14 Ah in battery capacity are connected in parallel to form one unit, and 96 units are connected in series to form a battery set. In this case, the size of the battery set is about 600 mm×700 mm×280 mm. Hence, when the battery pack is mounted in an electric vehicle or hybrid type car, the size of the battery set (occupying volume of the battery set) is preferred to be in a range of 600 mm to 700 mm in width in the longitudinal direction, 280 mm to 400 mm in width in the lateral direction, and 700 mm to 800 mm in height.

(Shortest Distance $d_1$, $d_2$ between Outer Circumference of Unit Cell and First Wall)

In the battery pack for use in the rechargeable vacuum cleaner and electric-assisted bicycle, the shortest distance ($d_1$) between the outer circumferential surface of unit cells $2_1$ to $2_6$ in the vertical first row and the first wall $3a$ should be preferably in a range of 0 to 5 mm, and the shortest distance ($d_2$) between the outer circumferential surface of unit cells $2_7$ to $2_{12}$ in the vertical second row and the first wall $3a$ should be preferably in a range of 17 to 23 mm. This is because that, if the shortest distance ($d_1$) is more than 5 mm or the shortest distance ($d_2$) is out of the range of 17 to 23 mm, cooling at the draft port side of the unit cells is insufficient, and a sufficient temperature difference in the unit cells is not provided, so that enough high rate cycle characteristic may not be obtained.

In the battery pack for use in the electric vehicle or hybrid type car, the shortest distance ($d_1$) between the outer circumferential surface of unit cells $2_1$ to $2_6$ in the vertical first row and the first wall $3a$ should be preferably in a range of 0 to 5 mm, and the shortest distance ($d_2$) between the outer circumferential surface of unit cells $2_7$ to $2_{12}$ in the vertical second row and the first wall $3a$ should be preferably in a range of 32 to 40 mm. This is because that, if the shortest distance ($d_1$) is more than 5 mm or the shortest distance ($d_2$) is out of the range of 32 to 40 mm, cooling at the draft port side of the unit cells is insufficient, and a sufficient temperature difference in the unit cells is not provided, so that enough high rate cycle characteristic may not be obtained.

In the foregoing FIG. 1 through FIG. 27, unit cells are arranged in two vertical rows and six lateral rows, but the vertical rows may be increased to three or more. For example, in the case of three rows, unit cells in the vertical third row are spaced from each other and isolated from the vertical second row, and the region of each unit cell shortest in distance between the outer circumference and the first wall (the most projecting portion of the outer circumference) is preferably located in the gap among the unit cells of the vertical second row. The number of lateral rows is not particularly limited as far as it is larger than the number of vertical rows.

Figure 28:
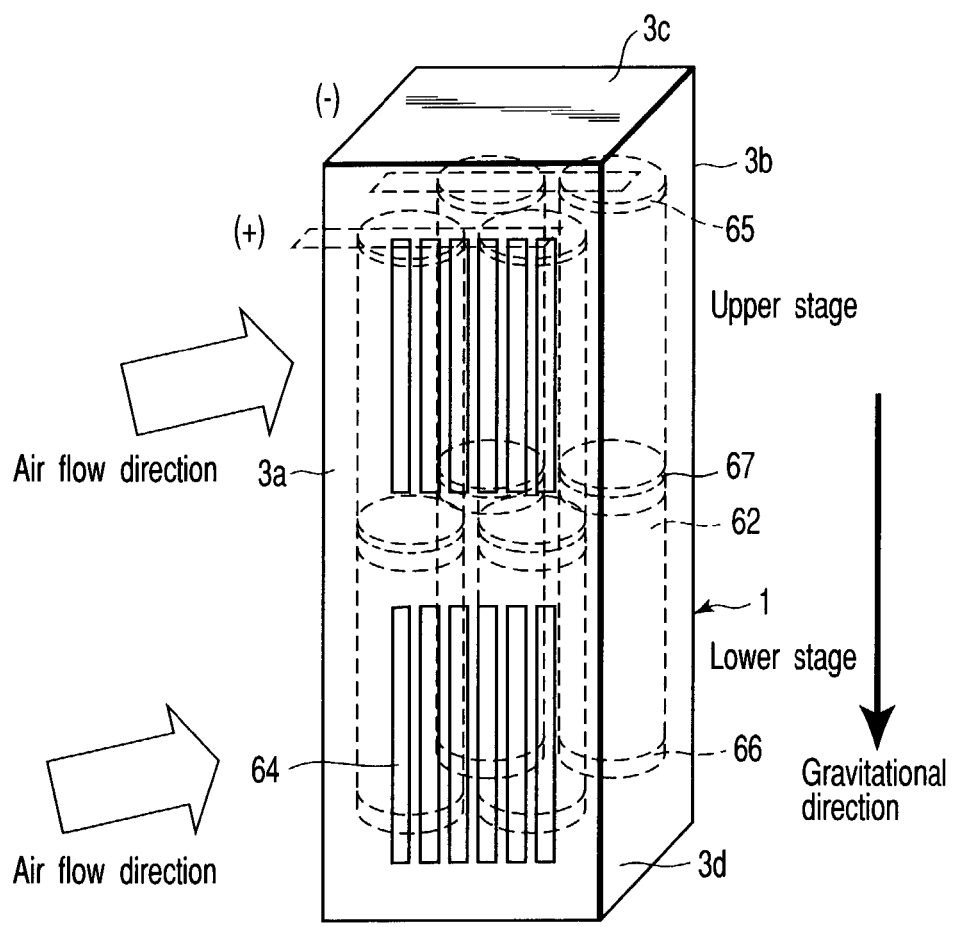
FIG. 28 is a perspective view schematically showing a further embodiment of the battery pack of the invention.

In FIG. 1, the secondary batteries are not stacked up in the axial direction (height direction), but the battery pack of the invention also allows stacking of the secondary batteries in the axial direction (height direction). Such example is shown in FIG. 28.

In the rectangular outer case 1, for example, eight cylindrical lithium ion secondary batteries (unit cells) 62 are accommodated in an upright state. Two lithium ion secondary batteries (unit cells) are connected in parallel to form one unit, and four units are connected in series to form a battery set. When the battery set is observed from the axial direction (from above), a two-dimensional battery array is vertical two rows (N rows)×lateral two rows (M rows). In this battery set, the secondary batteries are stacked up in the axial direction (height direction), and two stages are stacked up in the axial direction (height direction).

Of the two side walls in the longitudinal direction side of the outer case 1, the side wall facing the outer circumference of all unit cells 2 in the vertical first row is the first wall 3a, and the side wall positioned at the opposite side of the first wall 3a is the second wall 3b. The first wall 3a has six slender slits 64 formed laterally as the draft port, and two rows are formed vertically. On the other hand, the second wall 3b has six slender slits formed laterally as the exhaust port, and two rows are formed vertically (not shown).

In the unit cells 62 in the vertical first row, the region ($d_1$) on the outer circumference with the shortest distance from the first wall 3a is opposite to the draft port 64.

On the other hand, in the unit cells 62 in the vertical second row, the region ($d_2$) on the outer circumference with the shortest distance from the first wall 3a is opposite to the draft port 64 across the gap existing in the vertical first row. Herein, the gap existing in the vertical first row refers to the gap existing in the unit cells 62 and the gap between the unit cell positioned at the end of row and the case inside.

Thermocouples for measuring the temperature distribution in unit cells are preferred to be disposed same as explained in FIG. 1. In particular, the layout should be same as explained in relation to the temperature distribution. For the sake of simplicity, thermocouples are not shown in FIG. 28.

Inside of the lid plate 3c of the outer case 1, there is formed a first circular recess 65 in which the upper end portion of the unit cells 62 is accommodated. Further, inside of the bottom 3d the outer case 1, there is formed a second circular recess 66 in which the lower end portion of the unit cells 62 is accommodated. The first recess 65 and second recess 66 satisfy the formula (5):

$$d < D \quad (5)$$

where d is the depth (mm) of the first recess 65, and D is the depth (mm) of the second recess 66.

An annular support member 67 straddles between the upper end portion of the unit cells 62 in the height direction first row and the lower end portion of the unit cells 62 in the height direction second row. As a result, the unit cells in the height direction second row are fixed on the unit cells in the height direction first row. The coverage rate by the annular support member 67 should be set larger in the lower end portion of the unit cells 62 in the height direction second row than in the upper end portion of the unit cells 62 in the height direction first row. While satisfying the formula (5), the support member 67 covers more the lower end portion of the unit cells 62 in the height direction second row. Therefore, as shown in FIG. 28, the longitudinal direction of the unit cells and the gravitational direction can be matched, and when the air flow is blown to the unit cells from the direction orthogonal to the longitudinal direction of the unit cells, the temperature of the lower end portion of the unit cells can be set higher than in the upper end portion of the unit cells. Accordingly, the convection of nonaqueous electrolyte as shown in FIG. 14 may be formed.

The annular support member 67 can be made of fluoroplastic such as polytetrafluoroethylene (PTFE), an epoxy resin, or a silicone resin. The thickness of the support member 67 is about 0.5 mm to 1 mm.

(Rechargeable Vacuum Cleaner)

A rechargeable vacuum cleaner of the invention is explained.

The rechargeable vacuum cleaner contains a battery pack in the housing of the cleaner, and while the cleaner is being driven, it is charged after use. The rechargeable vacuum cleaner of the invention comprises a motor, and the battery pack of the invention. The battery pack is preferred to be arranged in an intake route or an exhaust route of the motor, so that the intake or exhaust may be taken into the battery set from the draft port of the outer case.

Figure 29:
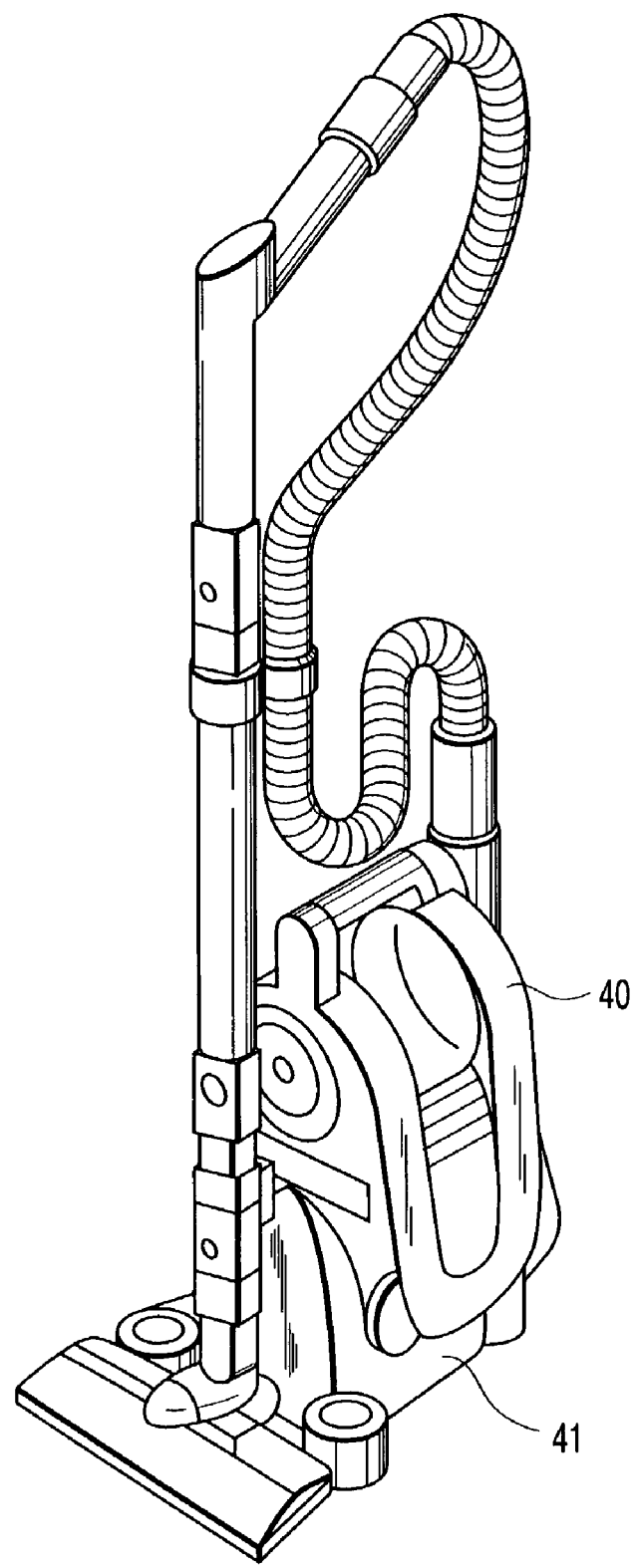
FIG. 29 is a schematic view showing an outline configuration of an example of a rechargeable vacuum cleaner of the invention.
Figure 30:
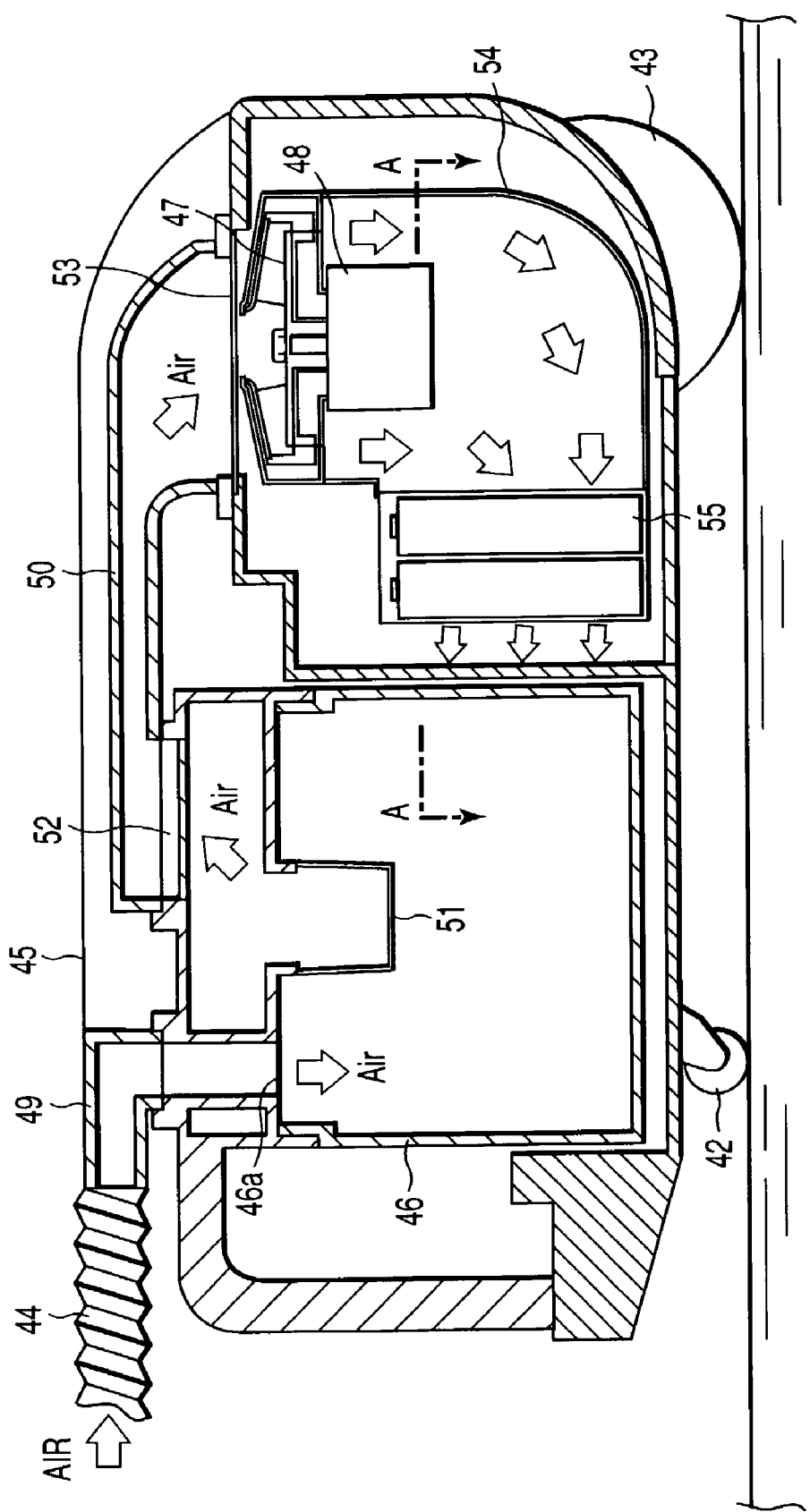
FIG. 30 is a partial sectional view showing an outline configuration of an example of a rechargeable electric vacuum cleaner of the invention.
Figure 31:
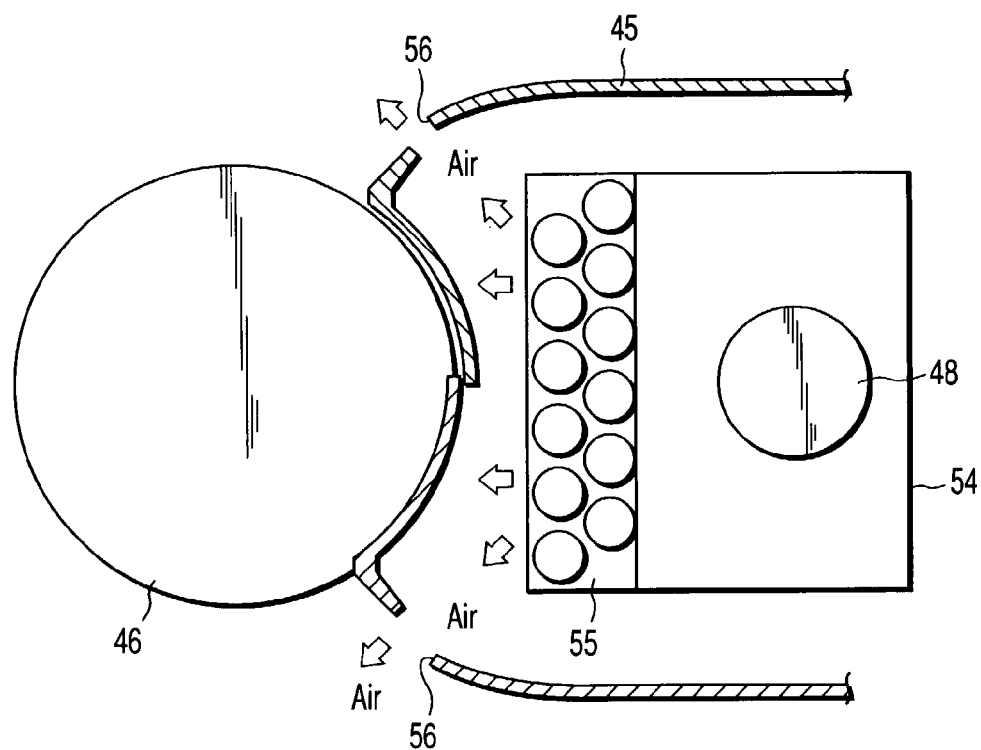
FIG. 31 is a sectional view taken along the line A—A of the vacuum cleaner main body in FIG. 30.

An example of the rechargeable vacuum cleaner of the invention is explained by referring to FIG. 29 to FIG. 31. FIG. 29 is a schematic view showing an outline configuration of an example of a rechargeable vacuum cleaner of the invention, FIG. 30 is a partial sectional view showing an outline configuration of an example of a rechargeable vacuum cleaner of the invention, and FIG. 31 is a sectional view along the line A—A of the vacuum cleaner main body in FIG. 30.

The cleaner main body 40 is mounted on a charger 41 serving also as a rest stand. In the bottom of the cleaner main body 40, a front wheel 42 and a pair of rear wheels 43 are provided. The cleaner main body 40 comprises a hose 44, a casing 45, a dust cup 46 as a dust compartment, and driving means for sucking dust particles from the hose 44 into the dust cup 46. The dust cup 46 and driving means are accommodated in the casing 45. The driving means includes a fan 47 as a suction machine, and a motor 48 for driving the fan 47. A suction duct 49 has its one end connected to the outlet of the hose 44, and the other end connected to an inlet 46a of the dust cup 46. An intake duct 50 is interposed between the dust cup 46 and fan 47. A first filter 51 is disposed at the outlet of the dust cup 46, a second filter 52 is disposed in the intake duct 50, and a third filter 53 is disposed between the intake duct 50 and fan 47.

In an exhaust duct 54 serving as an exhaust passage from the fan 47, a battery pack 55 is disposed such that the exhaust may be taken into the battery set from the draft port of the first wall of the outer case. An exhaust port 56 for releasing the exhaust from the fan 47 to outside is opened at both sides of the casing 45.

Operation during use of the cleaner main body 40 is explained.

When the battery pack 55 is discharged, the motor 48 is driven, and the impeller of the fan 47 is put in rotation, dust and foreign matter are sucked in, together with air, from the hose 44. The sucked air and dust particles are put into a dust pack 46 from the inlet 46a through the suction duct 49, and the majority of the dust is captured in the dust pack 46. Dust particles of sub-micron size which have not been captured in the dust pack 46 are contained in the air passing through the dust pack 46. This air passes through the first filter 51, second filter 52, intake duct 50, and third filter 53, and then are discharged outside of the fan 47 to pass through the exhaust duct 54.

Unit cells of the battery pack 55 generate heat by discharge, but since the exhaust passing through the exhaust duct 54 is taken in from the draft port of the first wall of the outer case, the draft port side of the unit cells in the vertical first and second rows can be cooled by this exhaust. Consequently, in individual unit cells, a sufficient temperature difference can be provided between the draft port side and the exhaust port side, and thereby precipitation of lithium dendrite can be suppressed, so that the high rate cycle characteristic can be enhanced.

In FIG. 29 to FIG. 31, the battery pack 55 is disposed in the exhaust duct 54 as the exhaust route, but the battery pack 55 may be also disposed in the intake duct 50 as the intake route, and the intake to the motor may be taken in from the draft port of the outer case for the cooling purpose.

(Hybrid Type Car and Electric Vehicle)

Figure 32:
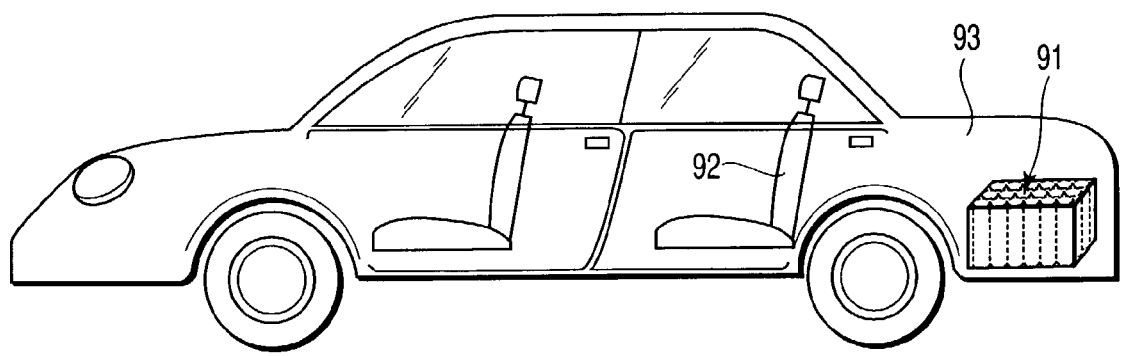
FIG. 32 is a schematic view showing an example of an automobile having the battery pack of the invention mounted therein.

The battery pack of the invention may be mounted on a hybrid type car or electric vehicle. FIG. 32 shows a hybrid type car in which an internal-combustion engine and a battery-driven motor are combined to form a traveling and driving source. In this hybrid type car, the internal-combustion engine is operated in the optimum condition. When the output is insufficient depending on the running condition, lack of output is compensated by the output of the battery-driven motor, and a regenerative power is absorbed when slowing down. Therefore, as compared with an ordinary vehicle running on internal-combustion engine alone, the traveling distance per unit fuel consumption is extending outstandingly. As the power source of the battery-driven motor, a battery pack 91 of the invention is used. The battery pack 91 is accommodated in a trunk 93 located behind rear seats 92.

Examples of the invention will be explained in detailed below while referring to the accompanying drawings.

EXAMPLE 1

Twelve cylindrical lithium ion secondary batteries $2_1$ to $2_{12}$ of 18650 size, 18 mm in diameter, 65 mm in length, and 1.5 Ah in capacity were prepared. Two lithium ion secondary batteries were connected in parallel by resistance welding with Ni tabs to form one unit, and six units were connected in series by leads to form a battery set. The battery array was vertical two rows×lateral six rows. When connecting by tabs, twelve unit cells were mutually spaced. The size of the obtained battery set was 135 mm in width (width in the longitudinal direction), 33 mm in depth (width in the lateral direction), and 65 mm in height.

By forming an outer case 1 by injection molding of epoxy resin around this battery set, the battery set was put in the outer case 1, and a battery pack in the dimensions of 140 mm×70 mm×38 mm having the structure as shown in FIG. 1 and FIG. 2 was fabricated.

Of the two side walls at the longitudinal direction side of the outer case 1, the first wall 3a has twelve rectangular lateral slits 4 of 2 mm in height and 35 mm in width arranged at equal intervals, and three rows were formed laterally, and a total of 36 draft ports were formed. On the other hand, the second wall 3b has twelve rectangular lateral slits 5 of 2 mm in height and 35 mm in width arranged at equal intervals, and three rows were formed laterally, and a total of 36 exhaust ports were formed. The rate of the first wall to the total area of the draft ports and the rate of the second wall to the total area of the exhaust ports were both 27%.

The arrangement of the unit cells $2_1$ to $2_{12}$ in the outer case 1 will be explained in detail.

As mentioned above, unit cells are arranged in two vertical rows, and the row opposite to the first wall 3a of the outer case 1 is supposed to be the vertical first row. In the unit cells $2_1$ to $2_6$ in the vertical first row, individually, the part of the outer circumferential surface, which is at a shorter distance ($d_1$) from the first wall 3a than any other parts, is opposite to the draft port 4. The gap G1 between the unit cells $2_1$ to $2_6$ in the vertical first row is set at 0.5 mm, which corresponds to 2.8% of the battery diameter. The shorter distance $d_1$ was 2 mm.

On the other hand, in the unit cells $2_7$ to $2_{12}$ in the vertical second row, individually, the part of the outer circumferential surface, which is at a shorter distance ($d_2$) from the first wall 3a than any other parts, is opposite to the draft port 4 across the gap existing in the vertical first row. The shorter distance $d_2$ was 2 mm. The gap G2 between the unit cells $2_1$ to $2_6$ in the vertical first row and the unit cells $2_7$ to $2_{12}$ in the vertical second row is set at a size corresponding to 1.0×G1. Herein, the gap existing in the vertical first row refers to the gap in the unit cells, the gap between the unit cell $2_1$ and the outer case 1, and the gap between the unit cell $2_6$ and the outer case 1.

The size of the gap G3* between the unit cell $2_7$ at the end of the vertical second row and its adjacent unit cell $2_8$, and the gap G3 among the unit cells $2_8$ to $2_{12}$ in the vertical second row are respectively equal to the gap G1.

EXAMPLES 2 TO 8

Battery packs were assembled in the same configuration as in Example 1, except that the gap G1 between the unit cells of the vertical first row, or the gap G2 between the unit cells of the vertical first row and the unit cells in the vertical second row was changed as shown in Table 1.

EXAMPLE 9

A battery pack was assembled in the same configuration as in Example 1, except that a heat equalizing plate was interposed between the unit cells $2_1$ to $2_6$ in the vertical first row and the unit cells $2_7$ to $2_{12}$ in the vertical second row.

As the heat equalizing plate, as shown in FIG. 6 and FIG. 7, a corrugated plate shaped along the outer circumference of unit cell was used. The heat equalizing plate was formed of aluminum, measuring 60 mm in height, 119 mm in width, and 1.0 mm in thickness. In the heat equalizing plate, two rectangular lateral slits of 10 mm in height and 25 mm in width were arranged vertically, and three rows were arranged laterally to form ventilation ports.

EXAMPLE 10

Six cylindrical lithium ion secondary batteries of 26650 size, 26 mm in diameter, 65 mm in length, and 3.0 Ah in capacity were prepared. Six lithium ion secondary batteries were connected in series by leads to form a battery set. The battery array was vertical two rows×lateral three rows. When connecting by leads, six unit cells were mutually spaced. The size of the obtained battery set was 95 mm in width (width in the longitudinal direction), 50 mm in depth (width in the lateral direction), and 65 mm in height.

By forming an outer case by injection molding of epoxy resin around this battery set, the battery set was put in the outer case, and a battery pack in the dimensions of 110 mm×70 mm×56 mm was fabricated.

Of the two side walls at the longitudinal direction side of the outer case, the first wall has twelve rectangular lateral slits of 3 mm in height and 30 mm in width arranged at equal intervals, and three rows were formed laterally, and a total of 36 draft ports were formed. On the other hand, the second wall has twelve rectangular lateral slits of 3 mm in height and 30 mm in width arranged at equal intervals, and three rows were formed laterally, and a total of 36 exhaust ports were formed. The rate of the total area of the draft ports to the first wall and the rate of the total area of the exhaust ports to the second wall were both 42%.

The arrangement of the unit cells in the outer case will be explained in detail.

As mentioned above, unit cells are arranged in two vertical rows, and the row opposite to the first wall of the outer case is supposed to be the vertical first row. In the unit cells in the vertical first row, individually, the part of the outer circumferential surface, which is at a shorter distance from the first wall than any other parts, is opposite to the draft port. The gap G1 between the unit cells in the vertical first row is set at 1 mm, which corresponds to 3.8% of the battery diameter. The shorter distance $d_1$ was 2 mm.

On the other hand, in the unit cells in the vertical second row, individually, the part of the outer circumferential surface, which is at a shorter distance from the first wall than any other parts, is opposite to the draft port across the gap existing in the vertical first row. The shorter distance $d_2$ was 2 mm. The gap G2 between the unit cells in the vertical first row and the unit cells in the vertical second row is set at a size corresponding to 1.0×G1. Herein, the gap existing in the vertical first row refers to the gap in the unit cells, and the gap between the unit cell and the outer case.

COMPARATIVE EXAMPLE 1

A battery pack was assembled in the same configuration as in Example 1, except that the unit cells were formed in tight contact without allowing gap, and that a heat equalizing plate was interposed between the unit cells in the vertical first row and the unit cells in the vertical second row. The heat equalizing plate was same as explained in Example 9.

In the obtained battery packs of Examples 1 to 10 and Comparative example 1, charging and discharging were repeated 200 cycles in the following condition, and the battery capacity was measured. Charging was, by the constant current and constant voltage system, conducted for 2 hours up to voltage of 24.9 V at current of 2 A. In discharging, while cooling by blowing air flow to the first wall of the outer case at air flow velocity of 1 m/s, the battery pack was discharged at a constant current of 10 A to a final voltage of 18 V. Assuming the initial capacity to be 100%, the battery capacity after 200 cycles is expressed as high rate cycle characteristic in Table 1. During discharge, temperature difference between the draft port side surface and exhaust port side surface of unit cells was measured by K type thermocouples 6, and the distribution of temperature difference (the dispersion of the difference between the minimum temperature and the maximum temperature) is shown in Table 1.

TABLE 1

| | Gap G1 in vertical first row (mm) | Ratio of G1 to battery diameter (%) | Gap G2 in vertical second row | Heat equalizing plate | Temperature difference in unit cells (° K.) | Battery capacity at 200 cycles (%) |
|---|---|---|---|---|---|---|
| Example 1 | 0.5 | 2.8 | G1 | Not provided | 3–6 | 83 |
| Example 2 | 0.1 | 0.6 | G1 | Not provided | 5–8 | 78 |
| Example 3 | 1.0 | 5.6 | G1 | Not provided | 3–6 | 83 |
| Example 4 | 3.0 | 16.7 | G1 | Not provided | 4–7 | 80 |
| Example 5 | 5.0 | 27.8 | G1 | Not provided | 4–8 | 76 |
| Example 6 | 1.0 | 5.6 | 0.5G1 | Not provided | 3–4 | 87 |
| Example 7 | 1.0 | 5.6 | 0.7G1 | Not provided | 3–5 | 85 |
| Example 8 | 1.0 | 5.6 | 0.9G1 | Not provided | 3–6 | 83 |
| Example 9 | 0.5 | 5.6 | G1 | Provided | 3–4 | 87 |
| Example 10 | 1.0 | 3.8 | G1 | Not provided | 3–5 | 85 |
| Comparative example 1 | None | 0 | None | Provided | 12–15 | Internal short-circuit after 16 cycles |
| Comparative example 2 | None | 0 | None | Not provided | 12–17 | 36 |
| Comparative example 3 | 0.5 | 2.9 | G1 | Not provided | 3–6 | 45 |

As clear from Table 1, it is found that the battery packs in Examples 1 to 10 are excellent in high rate discharge characteristic as compared with the battery pack in Comparative example 1.

On the contrary, in the battery pack in Comparative example 1, internal short-circuit occurred at the 16th cycle of charging, and the internal pressure was raised abnormally, and the current cut-off device was actuated. When the battery was disassembled, and the negative electrode surface was observed, heavy growth of dendrite was observed.

COMPARATIVE EXAMPLE 2

A battery pack was assembled in the same configuration as in Comparative example 1, except that cylindrical nickel hydrogen secondary batteries of 4/3 A size, 17.2 mm in diameter and 2.9 Ah in capacity were used instead of cylindrical lithium ion secondary batteries, and that 16 cells were connected in series (vertical 2 rows×lateral 8 rows).

COMPARATIVE EXAMPLE 3

A battery pack was assembled in the same configuration as in Example 1, except that the same cylindrical nickel hydrogen secondary batteries as explained in Comparative example 2 were used instead of cylindrical lithium ion secondary batteries.

The battery packs in Comparative examples 2 and 3 were charged and discharged repeatedly 200 cycles in the following condition, and the battery capacity was measured.

Charging was conducted for 2 hours at 2 A by constant current system. However, charging was stopped if fully charged within 2 hours and the cell temperature has reached the specified temperature. In discharging, while cooling by blowing air flow to the first wall of the outer case at air flow velocity of 1 m/s, the battery pack was discharged at a constant current of 10 A to a final voltage of 15 V. Assuming the initial capacity to be 100%, the battery capacity after 200 cycles was compared, and it was 36% in Comparative Example 2, and 45% in Comparative example 3. As a result, in the battery pack of nickel hydrogen secondary batteries, it was found that sufficient improvement of cycle life is not expected even if a temperature difference is provided between the draft port side and the exhaust port side of the unit cells.

EXAMPLE 11

A battery pack was assembled in the same configuration as in Example 3 except that the size of gap G3* of the unit cell $2_7$ at an end of vertical second row and its adjacent unit cell $2_8$ was set at 0.8×G1.

EXAMPLE 12

A battery pack was assembled in the same configuration as in Example 3 except that the size of gap G3* of the unit cell $2_7$ at an end of vertical second row and its adjacent unit cell $2_8$ was set at 0.5×G1.

EXAMPLE 13

A battery pack was assembled in the same configuration as in Example 3 except that the size of gap G3* of the unit cell $2_7$ at an end of vertical second row and its adjacent unit cell $2_8$ was set at 0.1×G1.

COMPARATIVE EXAMPLE 4

A battery pack was assembled in the same configuration as in Example 3 except that the gap in the size of G3* was not provided between the unit cell $2_7$ at an end of vertical second row and its adjacent unit cell $2_8$.

In the battery packs in Examples 11 to 13 and Comparative Example 4, the high rate cycle characteristic and distribution of temperature difference were measured same as in Example 1. The distribution of temperature difference was 3 to 5° K, and the battery capacity after 200 cycles was 86% in the battery pack in Example 11, and the distribution of temperature difference was 3 to 4° K, and the battery capacity after 200 cycles was 89% in the battery pack in Example 12.

On the contrary, the distribution of temperature difference was 4 to 7° K, and the battery capacity after 200 cycles was 78% in the battery pack in Example 13, and the distribution of temperature difference was 4 to 11° K, and the battery capacity after 200 cycles was 48% in the battery pack in Comparative Example 4.

The battery pack in Example 1 was used in the power source for cordless cleaner shown in FIG. 7 to FIG. 9. The battery pack was arranged in the exhaust duct 54 so as to be cooled by the air flow of the exhaust of the fan motor at the time of discharging. The air flow velocity of exhaust was 1 m/s.

The battery pack was charged by the constant current and constant voltage system, for 2 hours up to voltage of 24.9 V at current of 2 A. Discharging was conducted up to a final voltage of 18 V at an average current of 8.3 A. After charging and discharging 200 cycles repeatedly, the battery capacity was measured, and the battery capacity after 200 cycles was 86% of the initial capacity.

EXAMPLE 14

Twelve cylindrical lithium ion secondary batteries $2_1$ to $2_{12}$ Of 18650 size, 18 mm in diameter, 65 mm in length, and 1.5 Ah in capacity were prepared. Two lithium ion secondary batteries were connected in parallel by using Ni connection terminals by resistance welding to form one unit, and six units were connected in series by using Ni connection terminals by resistance welding to form a battery set. The battery array was vertical two rows×lateral six rows. By resistance welding connection by connection terminals, twelve unit cells were mutually spaced. The size of the obtained battery set was 135 mm in width (width in the longitudinal direction), 33 mm in depth (width in the lateral direction), and 65 mm in height.

By forming an outer case in a structure as shown in FIG. 9 and FIG. 10 by injection molding of epoxy resin around this battery set, the battery set was put in the outer case 1, and a battery pack in the dimensions of 140 mm×75 mm×38 mm was fabricated.

Of the two side walls at the longitudinal direction side of a case main body 71 of the outer case, the first wall 3a has ten rectangular lateral slits 4 of 2 mm in height and 35 mm in width arranged at equal intervals from a position of 5 mm from the lower end of the first wall 3a to a position of 5 mm from the upper end, and three rows were formed laterally, and a total of 30 draft ports were formed. The position of 5 mm from the lower end of the first wall 3a corresponds to 6.7% of the height of the outer case. Therefore the draft port non-forming region ranges from the lower end of the first wall 3a to the position corresponding to 6.7% of the height of the outer case.

On the other hand, the second wall 3b has ten rectangular lateral slits 5 of 2 mm in height and 35 mm in width arranged at equal intervals from a position of 5 mm from the lower end of the second wall 3b to a position of 5 mm from the upper end, and three rows were formed laterally, and a total of 30 exhaust ports were formed. The rate of the total area of the draft ports to the first wall and the rate of the total area of the exhaust ports to the second wall were both 20%.

The depth D of the second circular recess formed inside of the bottom of the outer case main body 71 of the outer case was set at 7 mm. On the other hand, the depth d of the first circular recess formed inside of a lid plate 73 of the outer case was set at 2 mm. Hence, the depths of these recesses satisfy the relation of the formula (5) described above.

The arrangement of the unit cells $2_1$ to $2_{12}$ in the outer case 1 will be explained in detail.

As mentioned above, unit cells are arranged in two vertical rows, and the row opposite to the first wall 3a of the outer case 1 is supposed to be the vertical first row. In the unit cells $2_1$ to $2_6$ in the vertical first row, individually, the part of the outer circumferential surface, which is at a shorter distance ($d_1$) from the first wall 3a than any other parts, is opposite to the draft port 4. The shorter distance $d_1$ was 2 mm. The gap G1 between the unit cells $2_1$ to $2_6$ in the vertical first row was set at 1 mm, which corresponds to 2.8% of the battery diameter.

On the other hand, in the unit cells $2_7$ to $2_{12}$ in the vertical second row, individually, the part of the outer circumferential surface, which is at a shorter distance ($d_2$) from the first wall $3a$ than any other parts, is opposite to the draft port $4$ across the gap existing in the vertical first row. The shorter distance $d_2$ was 2 mm. The gap G2 between the unit cells $2_1$ to $2_6$ in the vertical first row and the unit cells $2_7$ to $2_{12}$ in the vertical second row was set at 1 mm. Herein, the gap existing in the vertical first row refers to the gap in the unit cells, the gap between the unit cell $2_1$ and the outer case $1$, and the gap between the unit cell $2_6$ and the outer case $1$.

The size of the gap G3* between the unit cell $2_7$ at the end of the vertical second row and its adjacent unit cell $2_8$, and the gap G3 between the unit cells $2_8$ to $2_{12}$ in the vertical second row were both 1 mm.

EXAMPLE 15

Six cylindrical lithium ion secondary batteries of 26650 size, 26 mm in diameter, 65 mm in length, and 3.0 Ah in capacity were prepared. Six lithium ion secondary batteries were connected in series by Ni tabs using resistance welding to form a battery set. The battery array was vertical two rows×lateral three rows. Connection by Ni tabs was carried out such that six unit cells were mutually spaced. The size of the obtained battery set was 95 mm in width (width in the longitudinal direction), 50 mm in depth (width in the lateral direction), and 65 mm in height.

By forming an outer case by injection molding of epoxy resin around this battery set, the battery set was put in the outer case, and a battery pack in the dimensions of 110 mm×75 mm×56 mm was fabricated.

Of the two side walls at the longitudinal direction side of an outer case main body $71$ of the outer case, the first wall has ten rectangular lateral slits of 2 mm in height and 30 mm in width arranged at equal intervals from a position of 5 mm from the lower end of the first wall $3a$ to a position of 5 mm from the upper end, and three rows were formed laterally, and a total of 30 draft ports were formed. On the other hand, the second wall has ten rectangular lateral slits of 2 mm in height and 30 mm in width arranged at equal intervals from a position of 5 mm from the lower end of the second wall $3b$ to a position of 5 mm from the upper end, and three rows were formed laterally, and a total of 30 exhaust ports were formed. The rate of the total area of the draft ports to the first wall and the rate of the total area of the exhaust ports to the second wall were both 22%.

The depth D of the second circular recess formed inside of the bottom of the case main body of the outer case was set at 3 mm. Any recess was not formed in the inside of the lid plate of the outer case.

The arrangement of the unit cells in the outer case will be explained in detail.

As mentioned above, unit cells are arranged in two vertical rows, and the row opposite to the first wall of the outer case is supposed to be the vertical first row. In the unit cells in the vertical first row, individually, the part of the outer circumferential surface, which is at a shorter distance from the first wall than any other parts, is opposite to the draft port. The shorter distance $d_1$ was 2 mm. The gap G1 among the unit cells in the vertical first row was set at 1 mm, which corresponds to 3.8% of the battery diameter.

On the other hand, in the unit cells in the vertical second row, individually, the part of the outer circumferential surface, which is at a shorter distance from the first wall than any other parts, is opposite to the draft port across the gap existing in the vertical first row. The shorter distance $d_2$ was 2 mm. The gap G2 between the unit cells in the vertical first row and the unit cells in the vertical second row is set at a space corresponding to 1×G1. Herein, the gap existing in the vertical first row refers to the gap among the unit cells, and the gap between the unit cell and the outer case.

The size of the gap G3* between the unit cell $2_7$ at the end of the vertical second row and its adjacent unit cell $2_8$, and the gap G3 among the unit cells $2_8$ to $2_{12}$ in the vertical second row were both 1 mm.

EXAMPLE 16

A battery pack was assembled in the same configuration as in Example 14, except that the container was able to be separated into shells and a bottom lid, and that only shells were made of aluminum.

EXAMPLE 17

A battery pack was assembled in the same configuration as in Example 14, except that the location of the draft port and exhaust port was changed as described below.

The first wall $3a$ has ten rectangular lateral slits $4$ of 2 mm in height and 35 mm in width arranged at equal intervals from a position of 10 mm from the lower end of the first wall $3a$ to a position of 5 mm from the upper end, and three rows were formed laterally, and a total of 30 draft ports were formed. On the other hand, the second wall $3b$ has ten rectangular lateral slits $5$ of 2 mm in height and 35 mm in width arranged at equal intervals from a position of 5 mm from the lower end of the second wall $3b$ to a position of 5 mm from the upper end, and three rows were formed laterally, and a total of 30 exhaust ports were formed.

The position of 10 mm from the lower end of the first wall $3a$ is a position corresponding to 13% of the height of the outer case, and hence the draft port non-forming region ranges from the lower end of the first wall $3a$ to a position corresponding to 13% of the height of the outer case.

EXAMPLE 18

A battery pack was assembled in the same configuration as in Example 14, except that the location of the draft port and exhaust port was changed as described below.

The first wall $3a$ has ten rectangular lateral slits $4$ of 2 mm in height and 35 mm in width arranged at equal intervals from a position of 18.75 mm from the lower end of the first wall $3a$ to a position of 5 mm from the upper end, and three rows were formed laterally, and a total of 30 draft ports were formed. On the other hand, the second wall $3b$ has ten rectangular lateral slits $5$ of 2 mm in height and 35 mm in width arranged at equal intervals from a position of 5 mm from the lower end of the second wall $3b$ to a position of 5 mm from the upper end, and three rows were formed laterally, and a total of 30 exhaust ports were formed.

The position of 18.75 mm from the lower end of the first wall $3a$ is a position corresponding to 25% of the height of the outer case, and hence the draft port non-forming region ranges from the lower end of the first wall $3a$ to a position corresponding to 25% of the height of the outer case.

EXAMPLE 19

A battery pack was assembled in the same configuration as in Example 14, except that the location of the draft port and exhaust port was changed as described below.

Of the two side walls at the longitudinal direction side of the outer case 1, the first wall 3a has five rectangular lateral slits 4 of 2 mm in height and 35 mm in width arranged at equal intervals from a position of 35 mm from the lower end of the first wall 3a to a position of 5 mm from the upper end, and three rows were formed laterally, and a total of 15 draft ports were formed. On the other hand, the second wall 3b has five rectangular lateral slits 5 of 2 mm in height and 35 mm in width arranged at equal intervals from a position of 35 mm from the lower end of the second wall 3b to a position of 5 mm from the upper end, and three rows were formed laterally, and a total of 15 exhaust ports were formed.

The position of 35 mm from the lower end of the first wall 3a is a position corresponding to 47% of the height of the outer case, and hence the draft port non-forming region ranges from the lower end of the first wall 3a to a position corresponding to 47% of the height of the outer case.

The battery packs in Examples 14 to 19 were set up such that the longitudinal direction of the cells might coincide with the gravitational direction. In the battery packs of Examples 14 to 19, the air flow was blown vertically to the first wall 3a of the outer case. The air flow velocity before entering the slits in the first wall 3a was 1 m/s.

In the obtained battery packs of Examples 14 to 19, charging and discharging were repeated 300 cycles in the following condition, and the battery capacity was measured. Charging was, by the constant current and constant voltage system, conducted for 2 hours up to voltage of 24.9 V at current of 2 A. In discharging, while cooling by blowing air flow in the same condition as mentioned above, the battery pack was discharged at a constant current of 8 A to a final voltage of 18 V. Assuming the initial capacity to be 100%, the battery capacity after 300 cycles is expressed as high rate cycle characteristic in Table 2. Temperature distribution (temperature dispersion) of unit cells for composing the battery pack was measured in the same method as explained above in relation to temperature distribution, and the results are also recorded in Table 2. As thermocouples, K type thermocouples were used.

As clear from Table 2, it is found that the battery packs in Examples 14 to 19 are excellent in high rate discharge characteristic as compared with the battery pack in Example 1.

EXAMPLE 20

The battery pack in Example 14 was used in the power source for cordless cleaner as shown in FIG. 29 to FIG. 31. The battery pack was arranged in an exhaust duct 54 so as to be cooled by the exhaust air flow of the fan at the time of discharging. The air flow velocity of exhaust was 1 m/s.

The battery pack was charged by the constant current and constant voltage system for 5 hours up to voltage of 24.9 V at current of 1.5 A. Discharging was continued up to a final voltage of 18 V at current of 8.3 A. Repeating charging and discharging 300 cycles, the battery capacity was measure, and the battery capacity after 300 cycles was found to correspond to 83% of the initial capacity.

Thus, as described in detail herein, the invention provides a battery pack excellent in high rate cycle characteristic and a rechargeable vacuum cleaner comprising the battery pack.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A battery pack comprising:
   an outer case including first and second walls, the first wall including a draft port portion through which input cooling air is introduced, the second wall being located opposite to the first wall and including an exhaust port portion;
   a first row of at least 2 cylindrical lithium ion secondary batteries arranged in the outer case to face the first wall, and the first row of cylindrical lithium ion secondary batteries being spaced apart from each other; and
   a second row of at least 2 cylindrical lithium ion secondary batteries arranged adjacent to the first row of cylindrical lithium ion secondary batteries in the outer case, and arranged in portions facing respective spaces

TABLE 2

| | Recess | Draft port non-forming region (%) | Outer case material | Temperature difference in unit cells (° C.) | Battery capacity at 300 cycles (%) |
|---|---|---|---|---|---|
| Example 14 | Bottom plate and lid plate | 6.7 | Epoxy resin | 3–7 | 82 |
| Example 15 | Bottom plate only | 6.7 | Epoxy resin | 3–7 | 82 |
| Example 16 | Bottom plate and lid plate | 6.7 | Shell made of Al | 4–6 | 85 |
| Example 17 | None | 13 | Epoxy resin | 3–7 | 81 |
| Example 18 | None | 25 | Epoxy resin | 3–8 | 78 |
| Example 19 | None | 47 | Epoxy resin | 4–10 | 73 |
| Example 1 | None | 6.7 | Epoxy resin | 3–6 | 77 | between the cylindrical lithium ion secondary batteries of the first row to thereby be offset with respect to the cylindrical lithium ion secondary batteries of the first row, wherein:

parts of outer circumferential surfaces of the first row of cylindrical lithium ion secondary batteries, each of which is closer than any other part to the first wall, face the draft port portion of the first wall of the outer case; and parts of outer circumferential surfaces of the second row of cylindrical lithium ion secondary batteries, each of which is closer than any other part to the first wall, directly face the draft port portion of the outer case through the spaces.

2. The battery pack according to claim 1, satisfying the following formulas (1) and (2):

$$0.1 \leq G1 \leq 5 \qquad (1)$$

$$0.5G1 \leq G2 \leq G1 \qquad (2)$$

where G1 is a gap (mm) between secondary batteries in the first row, and G2 is a gap (mm) between secondary batteries in the first row and secondary batteries in the second row.

3. The battery pack according to claim 1, satisfying the following formula (3):

$$0.2G1 \leq G3^* \leq 0.8G1 \qquad (3)$$

where G3* is a gap (mm) between a secondary battery positioned at an end of the secondary batteries in the second row and a secondary battery positioned adjacent to the secondary battery.

4. The battery pack according to claim 1, wherein each secondary battery in the first row has a temperature distribution in which a temperature difference ranges from 2° K to 10° K.

5. The battery pack according to claim 1, wherein each of the draft port portion and the exhaust port portion comprises a plurality of openings, a total area of the openings of the draft port portion falls within a range of 10% to 80% of an area of the first wall, and a total area of the openings of the exhaust port portion falls within a range of 10% to 80% of an area of the second wall.

6. The battery pack according to claim 1, wherein a heat equalizing plate comprising ventilation ports is interposed between the secondary batteries in the first row and the secondary batteries in the second row.

7. The battery pack according to claim 1, wherein an inside of the first wall of the outer case is a corrugated surface, and each secondary battery in the vertical first row is accommodated in a recess in the corrugated surface.

8. The battery pack according to claim 1, wherein an inside of the first wall and an inside of the second wall of the outer case are respectively corrugated surfaces, and each secondary battery in the vertical first row is accommodated in a recess of the corrugated surface of the first wall, and each secondary battery in the vertical N-th row is accommodated in a recess of the corrugated surface of the second wall.

9. The battery pack according to claim 1, wherein the shorter distance of each secondary battery in the first row is in a range of 0 mm to 5 mm.

10. The battery pack according to claim 1, wherein at least part of the outer case is covered with a shock absorbing material.

11. The battery pack according to claim 1, wherein a longitudinal direction of each of the first row of cylindrical lithium ion secondary batteries and the second row of cylindrical lithium ion secondary batteries is parallel to a gravitational direction or orthogonal to the gravitational direction.

12. A battery pack comprising:

an outer case including first and second walls, the first wall including a draft port portion through which input cooling air is introduced, the second wall being located opposite to the first wall and including an exhaust port portion;

a first row of at least 2 cylindrical lithium ion secondary batteries arranged in the outer case to face the first wall, the first row of cylindrical lithium ion secondary batteries being spaced apart from each other; and a second row of at least 2 cylindrical lithium ion secondary batteries arranged adjacent to the first row of cylindrical lithium ion secondary batteries in the outer case, and arranged in portions facing respective spaces between the cylindrical lithium ion secondary batteries of the first row to thereby be offset with respect to the cylindrical lithium ion secondary batteries of the first row, wherein:

a longitudinal direction of each of the first row of cylindrical lithium ion secondary batteries and the second row of cylindrical lithium ion secondary batteries is parallel to a gravitational direction;

parts of outer circumferential surfaces of the first row of cylindrical lithium ion secondary batteries, each of which is closer than any other part to the first wall, face the draft port portion of the first wall of the outer case; and parts of outer circumferential surfaces of the second row of cylindrical lithium secondary batteries, each of which is closer than any other part to the first wall, directly face the draft port portion of the first wall of the outer case through the spaces.

13. The battery pack according to claim 12, wherein a recess for accommodating a lower end portion of the unit cells is formed in an inside of a bottom of the outer case.

14. The battery pack according to claim 12, wherein a first recess in which an upper end portion of the unit cells is accommodated is formed in an inside of a top of the outer case, a second recess in which a lower end portion of the unit cells is accommodated is formed in an inside of a bottom of the outer case, and the first recess and second recess satisfy the following formula (4).

$$d < D \qquad (4)$$

where d is a depth (mm) of the first recess and D is a depth (mm) of the second recess.

15. The battery pack according to claim 12, wherein a lowest portion of the first wall has no draft ports and has a height that is 25% or less of a height of the outer case.

16. The battery pack according to claim 12, wherein a ventilation port is formed in at least one of a top and a bottom of the outer case.

17. The battery pack according to claim 12, wherein the first wall and the second wall of the outer case, a third wall facing the outer circumferential surface of the cylindrical lithium ion secondary batteries in the first row to vertical N-th row, and a fourth wall positioned at the opposite side of the third wall are formed of at least one metal selected from the group consisting of aluminum, aluminum alloy, magnesium, magnesium alloy, titanium, titanium alloy, iron, iron alloy, and stainless steel.

18. The battery pack according to claim 12, wherein a size of the battery set is selected from the following group consisting of (A) to (C):
  (A) a width in the longitudinal direction of the battery set is in a range of 135 mm to 250 mm, a width in the lateral direction of the battery set is in a range of 33 mm to 50 mm, and a height of the battery set is in a range of 65 mm to 130 mm;
  (B) a width in the longitudinal direction of the battery set is in a range of 175 mm to 350 mm, a width in the lateral direction of the battery set is in a range of 33 mm to 50 mm, and a height of the battery set is in a range of 65 mm to 130 mm;
  (C) a width in the longitudinal direction of the battery set is in a range of 600 mm to 700 mm, a width in the lateral direction of the battery set is in a range of 280 mm to 400 mm, and a height of the battery set is in a range of 700 mm to 800 mm.

19. The battery pack according to claim 1, wherein at least one row of cylindrical lithium secondary batteries are arranged adjacent to the second row of cylindrical lithium secondary batteries in the outer case, and the total number of rows of cylindrical lithium secondary batteries in the outer case falls within a range of 3 to 5.

* * * * *

UNITED STATES PATENT AND TRADEMARK OFFICE
CERTIFICATE OF CORRECTION

| | | |
|---|---|---|
| PATENT NO. | : 7,014,949 B2 | Page 1 of 1 |
| APPLICATION NO. | : 10/327105 | |
| DATED | : March 21, 2006 | |
| INVENTOR(S) | : Kanai et al. | |

It is certified that error appears in the above-identified patent and that said Letters Patent is hereby corrected as shown below:

Title page,
Items [45] and [*] Notice, should read as follows:
-- [45] Date of Patent: Mar. 21, 2006

[*] Notice: Subject to any disclaimer, the term of this patent is extended or adjusted under 35 U.S.C. 154(b) by 0 days. --.

Signed and Sealed this

Twentieth Day of June, 2006

JON W. DUDAS
*Director of the United States Patent and Trademark Office*